(12) United States Patent
Brandhorst, Jr. et al.

(10) Patent No.: US 11,306,255 B2
(45) Date of Patent: Apr. 19, 2022

(54) MULTISTAGE THERMOLYSIS METHOD FOR SAFE AND EFFICIENT CONVERSION OF E-WASTE MATERIALS

(71) Applicant: CHZ TECHNOLOGIES, LLC, Austintown, OH (US)

(72) Inventors: Henry W. Brandhorst, Jr., Auburn, AL (US); Ullrich H. Engel, Camberg (DE); Charles T. Ludwig, Auburn, AL (US); Ernest J. Zavoral, Sr., Canfield, OH (US)

(73) Assignee: CHZ Technologies, LLC, Austintown, OH (US)

( * ) Notice: Subject to any disclaimer, the term of this patent is extended or adjusted under 35 U.S.C. 154(b) by 0 days.

(21) Appl. No.: 16/949,979

(22) Filed: Nov. 23, 2020

(65) Prior Publication Data

US 2021/0071086 A1 Mar. 11, 2021

Related U.S. Application Data

(60) Division of application No. 15/729,023, filed on Oct. 10, 2017, now Pat. No. 10,961,461, which is a
(Continued)

(51) Int. Cl.
*C10L 5/48* (2006.01)
*C10B 57/04* (2006.01)
(Continued)

(52) U.S. Cl.
CPC .............. *C10B 57/04* (2013.01); *B09B 3/00* (2013.01); *C10B 47/00* (2013.01); *C10B 47/44* (2013.01);
(Continued)

(58) Field of Classification Search
CPC ......... C10B 47/00; C10B 47/44; C10B 49/02; C10B 53/00; C10B 53/07; C10B 57/02;
(Continued)

(56) References Cited

U.S. PATENT DOCUMENTS 3,825,464 A 7/1974 Crowley
3,899,323 A 8/1975 Van Slyke
(Continued)

FOREIGN PATENT DOCUMENTS

AU 744057 2/2002
CA 2133222 3/1993
(Continued)

OTHER PUBLICATIONS

Cui et al., "Metallurgical recovery of metals from electronic waste: A review", Journal of Hazardous Materials, vol. 158, pp. 228-256, Feb. 4, 2008.
(Continued)

*Primary Examiner* — Jonathan Miller
(74) *Attorney, Agent, or Firm* — McKee, Voorhees & Sease, PLC

(57) ABSTRACT

Clean, safe and efficient methods, systems, and processes for utilizing thermolysis methods to processes to convert various e-waste sources into Clean Fuel Gas and Char source are disclosed. The invention processes e-waste sources, such as for example whole circuit boards, to effectively shred and/or grind the waste source, and then process using thermolysis methods to destroy and/or separate halogen and other dangerous components to provide a Clean Fuel Gas and Char source, along with the ability to recover precious metals and other valuable components from the Char.

12 Claims, 18 Drawing Sheets
(17 of 18 Drawing Sheet(s) Filed in Color)

Related U.S. Application Data continuation of application No. 15/163,199, filed on May 24, 2016, now Pat. No. 9,850,433.

(60) Provisional application No. 62/273,751, filed on Dec. 31, 2015.

(51) Int. Cl.

| | | |
|---|---|---|
| B09B 3/00 | (2022.01) | |
| C10K 1/00 | (2006.01) | |
| C10K 1/12 | (2006.01) | |
| C10B 47/44 | (2006.01) | |
| C10B 53/00 | (2006.01) | |
| C10B 53/07 | (2006.01) | |
| C10B 57/02 | (2006.01) | |
| C10L 5/44 | (2006.01) | |
| C10B 47/00 | (2006.01) | |
| C10B 49/02 | (2006.01) | |
| C10L 3/00 | (2006.01) | |
| C22B 7/00 | (2006.01) | |
| B29B 17/04 | (2006.01) | |
| B01D 47/00 | (2006.01) | |

(52) U.S. Cl.
CPC .............. *C10B 49/02* (2013.01); *C10B 53/00* (2013.01); *C10B 53/07* (2013.01); *C10B 57/02* (2013.01); *C10K 1/002* (2013.01); *C10K 1/122* (2013.01); *C10L 3/00* (2013.01); *C10L 5/447* (2013.01); *C10L 5/48* (2013.01); *B01D 47/00* (2013.01); *B29B 2017/0496* (2013.01); *C10L 2200/0469* (2013.01); *C10L 2290/02* (2013.01); *C10L 2290/04* (2013.01); *C10L 2290/28* (2013.01); *C10L 2290/545* (2013.01); *C22B 7/00* (2013.01); *Y02E 50/10* (2013.01); *Y02E 50/30* (2013.01); *Y02P 20/143* (2015.11)

(58) Field of Classification Search
CPC ........ C10B 57/04; C10K 1/002; C10K 1/122; C10L 3/00; C10L 3/447; C10L 3/48; Y02E 50/10; Y02E 50/30

See application file for complete search history.

(56) References Cited

U.S. PATENT DOCUMENTS

| | | | |
|---|---|---|---|
| 4,317,800 A | 3/1982 | Sloterdijk et al. | |
| 4,874,486 A | 10/1989 | Hanulik | |
| 5,139,203 A | 8/1992 | Alavi | |
| 5,427,650 A | 6/1995 | Holloway | |
| 6,084,139 A | 7/2000 | Van Der Giessen et al. | |
| 6,178,899 B1 | 1/2001 | Kaneko et al. | |
| 8,138,232 B2 | 3/2012 | Maeurer et al. | |
| 8,188,329 B2 | 5/2012 | Nowottny et al. | |
| 8,308,843 B2 | 11/2012 | Wu | |
| 8,377,382 B2 | 2/2013 | Nowottny et al. | |
| 8,419,902 B2 * | 4/2013 | Feerer ................. F23G 5/006 202/96 |
| 8,800,775 B2 | 8/2014 | Thomas et al. | |
| 8,864,946 B2 | 10/2014 | Scheirs | |
| 2009/0020052 A1 | 1/2009 | Becchetti et al. | |
| 2013/0174694 A1 | 7/2013 | Xu | |
| 2013/0256113 A1 | 10/2013 | Tumiatti et al. | |
| 2014/0069798 A1 | 3/2014 | Hayward et al. | |
| 2014/0090518 A1 | 4/2014 | Stumpf et al. | |
| 2014/0182194 A1 | 7/2014 | Unger et al. | |

FOREIGN PATENT DOCUMENTS

| | | | |
|---|---|---|---|
| CH | 678131 A5 | 7/1991 | |
| CN | 101444784 A | 6/2009 | |
| CN | 101612628 A | 12/2009 | |
| CN | 101767104 A | 7/2010 | |
| CN | 101992203 A | 3/2011 | |
| CN | 101444784 B | 5/2011 | |
| CN | 102061008 A | 5/2011 | |
| CN | 201855831 U | 6/2011 | |
| CN | 102172600 A | 9/2011 | |
| CN | 102218439 A | 10/2011 | |
| CN | 102219922 A | 10/2011 | |
| CN | 102350429 A | 2/2012 | |
| CN | 202207705 U | 5/2012 | |
| CN | 101992203 B | 4/2013 | |
| CN | 102172600 B | 4/2013 | |
| CN | 103831287 A | 6/2014 | |
| CN | 103846272 A | 6/2014 | |
| CN | 103846273 A | 6/2014 | |
| CN | 203678829 U | 7/2014 | |
| CN | 104384168 A | 3/2015 | |
| CN | 104479756 A | 4/2015 | |
| GB | 1297734 A | 11/1972 | |
| IN | 02674 A | 6/2015 | |
| JP | 8112580 A | 5/1996 | |
| KR | 20070077114 A | 2/2009 | |
| KR | 20090036003 A | 6/2009 | |
| KR | 20140089905 A | 7/2014 | |
| KR | 20150014238 A | 2/2015 | |
| TW | 201028224 A1 | 8/2010 | |
| WO | 9000700 A1 | 1/1990 | |
| WO | 2014167139 A2 | 10/2014 | |
| WO | 2015024102 A1 | 2/2015 | |
| WO | WO 2015/09477 A1 * | 6/2015 | ............... C10J 3/62 |

OTHER PUBLICATIONS

Demarco et al., "Pyrolysis of electrical and electronic wastes", J. Anal. Appl. Pyrolysis, vol. 82, pp. 179-183, Mar. 14, 2008.
Elliott, Bobby, "The FPD era: Numbers, challenges and success strategies", E-Scrap News, Power Point Presentation, 30 pages, 2015.
White et al., "Patent Landscape Report on E-Waste Recycling Technologies", WIPO, 145 pages, Nov. 2013.
Jamakanga et al., "Feasibility Study for Recovering Precious Metals from E-Waste", Harare Institute of Technology, 74 pages. 2014.
He et al., "WEEE recovery strategies and the WEEE treatment status in China", Journal of Hazardous Materials, vol. B136, pp. 502-512, Apr. 18, 2006.
Jie et al., "Product characterization of waste printed circuit board by pyrolysis", J. Anal. Appl. Pyrolysis, vol. 83, pp. 185-189, Aug. 10, 2008.
Kang et al., "Electronic waste recycling: A review of U.S. infrastructure and technology options", Resources, Conservation and Recycling, vol. 45, pp. 368-400, Jun. 2, 2005.
Luda, Maria, "Recycling of Printed Circuit Boards", Integrated Waste Management, vol. 2, pp. 285-299, Aug. 1, 2011.
Luyima, Alex, "Recycling of electronic waste: printed wiring boards", Doctoral Dissertations, Curtis Laws Wilson Library, 156 pages, Jun. 1, 2013.
"Major Processes for Recovery of Precious Metals from E-waste", E-Waste Processing Write up, 3 pages, Apr. 25, 2016.
Mankhand et al., Pyrolysis of Printed Circuit Boards, International Journal of Metallurgical Engineering, vol. 1, No. 6, pp. 102-107, Jan. 1, 2012.
Molto, J., "Pyrolysis and combustion of electronic wastes", J. Anal. Appl. Pyrolysis, vol. 84, pp. 68-78, Oct. 22, 2008.
"Printed Circuit Boards", Mechanical Treatment Concepts, URT Umweldt and Recyclingtechnik GmbH, 2 pages. Sep. 21, 2015.
Quan et al., "Combustion and Pyrolysis and Electronic Waste: Thermogravimetric Analysis and Kinetic Model", Procedia Environmental Sciences, vol. 18, pp. 776-782, Jan. 1, 2013.
Sun et al., "Kinetic Study of the Pyrolysis of Waste Printed Circuit Boards Subject to Conventional and Microwave Heating", Energies, vol. 5, pp. 3295-3306, Aug. 24, 2012.
Watson et al., "Toxic Transformers: a review of the hazards of brominated & chlorinated substances in electrical and electronic equipment", Greenpeace Research Laboratories Technical Note, 48 pages, Jan. 2010.

(56) References Cited

OTHER PUBLICATIONS

Kunststoff-Und Umwelttechnik GMBH, PCT/DE2012/100057, filed Mar. 9, 2012, The International Search Report and the Written Opinion of the International Searching Authority, dated Oct. 24, 2012.

Aliquippa Holdings, Inc., "Latest Waste-to-Energy Technology", dated Apr. 26, 2015, 2 pages, last accessed on Feb. 23, 2017.

Tomar et al., "Electricity from Waste—Bibliographic Survey", Sustainable Energy, vol. 2, No. 3, pp. 108-115, May 20, 2014.

Yang et al., "Pyrolysis and dehalogenation of plastics from waste electrical and electronic equipment (WEEE): A review", Waste Management, vol. 33, pp. 462-473, 2013.

International Searching Authority in connection with PCT/US2016/067091 filed Dec. 16, 2016, "The International Search Report and the Written Opinion of the International Searching Authority, or the Declaration", 11 pages, dated Mar. 23, 2017.

Pakpahan et al., "Effect of Temperature on the Formation and Degradation of Polycyclic Aromatic Hydrocarbons," International Conference on Emerging Technologies in Environmental Science and Engineering, Aligarh, India, 6 pages, Oct. 26, 2009.

Zhou et al., "Polycyclic Aromatic Hydrocarbon Formation from the Pyrolysis/Gasification of Lignin at Different Reaction Conditions," Energy & Fuels, vol. 28, pp. 6371-6379, Sep. 17, 2014.

\* cited by examiner

MULTISTAGE THERMOLYSIS METHOD FOR SAFE AND EFFICIENT CONVERSION OF E-WASTE MATERIALS

CROSS-REFERENCE TO RELATED APPLICATIONS

This application is a Divisional Application of U.S. Ser. No. 15/729,023 filed Oct. 10, 2017, which is a Continuation Application of U.S. Ser. No. 15/163,199 filed May 24, 2016, now U.S. Pat. No. 9,850,433 issued Dec. 26, 2017, which claims priority under 35 U.S.C. § 119 to Provisional Application U.S. Ser. No. 62/273,751 filed Dec. 31, 2015, titled Multistage Thermolysis Method for Safe and Efficient Conversion of E-Waste Materials, herein incorporated by reference in its entirety including, without limitation, the specification, claims, and abstract, as well as any figures, tables, or drawings thereof.

FIELD OF THE INVENTION

The invention relates to clean, safe and efficient methods, systems and processes for utilizing thermolysis methods to processes to convert various e-waste sources into a Clean Fuel Gas and Char source. Thermolysis provides an advanced pyrolysis methodology for heating and converting e-waste sources as disclosed herein. In a particular aspect, the invention processes e-waste sources, such as, for example, whole circuit boards, to effectively shred and/or grind the waste source, and then process using thermolysis methods to separate, neutralize and/or destroy halogen and other hazardous components to provide a Clean Fuel Gas and Char source, along with the ability to recover precious metals and other valuable components from the Char.

BACKGROUND OF THE INVENTION

The global e-waste market creates over 50 million tons per year with an estimated 3% (1.5 million tons) in printed wiring boards (PWB), also referred to as printed circuit boards (PCB) and an estimated 30% (15 million tons) in plastic resins. The U.S. alone contributes between about 28-33% of the global e-waste totals. The e-waste market is expected to continue to increase an estimated 10-15% annually with the global consumer demand appetite for newest electrical and electronic equipment. Simply put, the world is awash in e-wastes. The result is a critical and worsening economic environment in need for solutions to discarded e-waste products. Globally, the values of precious metals, copper and aluminum (predominant in e-waste sources) have fluctuated significantly further reducing the interest in effectively recovering or recycling components from the ever-growing e-waste recycling/recovery market. In addition, various state regulations aim to restrict or limit landfill dumping of e-waste sources, resulting in significantly reduced incentives for processing e-waste sources.

Accumulating e-waste sources present a number of difficulties in developing processing techniques. Different approaches have been used for processing waste electrical and electronic equipment (WEEE), a term broadly referring to the spectrum of products ranging from computers, printers and faxes, to washing machines. In particular, WEEE are classified into 14 distinct categories including: Large household appliances; Small household appliances; IT and telecommunications equipment; Consumer equipment; Lighting equipment; Electrical and electronic tools; Toys, leisure and sports equipment; Medical devices; Monitoring and control instruments; Automatic dispensers; Display equipment; Refrigeration equipment; Gas discharge lamps; and Photovoltaic panels.

The four major categories of e-waste which are included in the WEEE classifications include: Printed Wiring Boards (PWBs), e-plastics, Flat screen displays (FSDs) and toner cartridges. As one skilled in the art ascertains, myriad other types of electrical and electronic devices such as cell phones, laptops, handhelds, appliances, and other devices are all included within these classifications. Electronics recycling is historically a very labor intense operation. This is a result of the diverse compositions making up e-waste sources. Plastic housings from electronic devices are ineffectively recycled as collection, sorting, re-pelletizing and shipping costs may be twice as high as the costs for virgin raw materials based on natural gas-based feed stocks. FSDs containing mercury provide another example of expense to process e-waste sources. Each flat screen display requires approximately 20 minutes' disassembly to remove the delicate mercury lamps. In addition to the ultra-high costs associated with this recycling process, the frequent mercury contamination from poor disassembly processing and breakage present a huge issue to recyclers. These examples demonstrate that the manual recycling of e-waste sources does not provide a cost-effective solution to the accumulating e-waste supply.

There are also safety concerns with processing e-waste sources. A significant percentage of the recycled polymers contain toxic compounds, including halogenated hydrocarbons and organics, antimony oxides and other polymer additive flame and/or fire and/or fire retardants. Description of hazards of halogenated substances in electrical and electronic equipment is described by Watson et al., Greenpeace Research Laboratories Technical Note, January 2010. These components are formulated in plastic housings and other components of e-waste sources to provide fire retardancy, as required to meet the global UL-94 flammability regulations. As a result, the housings cannot easily be landfilled due to the toxic flame and/or fire retardants. In the U.S. the EPA will not allow smelters to process circuit boards and release these toxins into the environment. Such toxins result from the combustion of halogenated hydrocarbons and organics generating toxic byproducts such as aromatics and polycyclic aromatic hydrocarbons (PAHs), halogenated dibenzodioxins, halogenated dibenzofurans, biphenyls, pyrenes, and the like. Combustion processes generate these toxic materials which then must be removed downstream of the process and thereby render incineration approaches unsuccessful and/or not economical. As a result, large volumes of e-waste are shipped off-shore to smelters, which are becoming less economically attractive due to high transportation, processing and environmental costs. Moreover, the smelting process is inefficient and a large percentage of metals can be lost in the smelting process.

There remains a need for efficient processing of a variety of e-waste sources. A 2013 World Intellectual Property Organization (WIPO) patent landscape report titled E-Waste Recycling Technologies identify a myriad of end products and components, including the following categories and descriptions:

Batteries (containing hazardous cadmium and other toxins), Printed Wiring Boards and Wires or Cables.

Capacitors—components making up a large proportion of electronics on a circuit board and contain exotic and often hazardous materials used as dielectrics LEDs—another common Printed Wiring Board sub-component and typically in a discrete package, these components also contain a mix of material classes, such as semiconductors, ferrous and non-ferrous metals and plastics.

Magnetic components—an interesting class in that these are likely a primary source of rare earth elements, in particular neodymium.

Computers/laptops; Hand-held Devices; Displays; Household Appliances—these topics are the primary "end product" types mentioned in the WIPO landscape. The displays are somewhat of a hybrid source as they can be both end products in television or computer monitor form, or components, such as part of a mobile device, laptop or tablet device.

Telecom equipment—this grouping of e-waste is one of high priority. Driven by the subscriber business model and rapid obsolescence of the mobile device industry, mobile phones, tablets and other devices make up a very large proportion of the e-waste streams in most countries. In addition to phones and tablets other telecommunications equipment is also included, such as smartphones, switch gear, interconnect servers, mobile phones, stationary landline phone and hubs, for example.

Accordingly, it is an objective of the claimed invention to solve the long-standing problem and need in the art for efficient methods for processing a myriad of e-waste sources.

A further object of the invention is to provide methods, systems, and/or processes for utilizing thermolysis methods to safely and efficiently convert various e-waste sources to a Clean Fuel Gas and Char source without generation (and further the removal of) toxic byproducts, including small molecules, including those chlorinated polymers commonly used in these waste input streams. Toxic byproducts further include, for example, VOCs, aromatics and polycyclic aromatic hydrocarbons (PAHs), dioxins and furans, including halogenated dibenzodioxins and halogenated dibenzofurans, biphenyls, pyrenes, cadmium, lead, antimony, arsenic, beryllium, chlorofluorocarbons (CFCs), mercury, nickel and other organic compounds. As a result, the methods, systems, and/or processes of the invention meet even the most rigid environmental standards.

A further object of the invention is to provide methods, systems, and/or processes for utilizing thermolysis methods to safely and efficiently convert various e-waste sources to a Clean Fuel Gas and Char source. In particular, the generation of a Clean Fuel Gas provides a desirable waste-to-energy pathway from a previously unutilized waste source through the recycling of tars and oils to generate Clean Fuel Gas to thereby reuse the energy that went into the original fabrication. In a further application, the generation of the Char source is suitable for further recycling and/or use of the Char source for further separation of desirable components for various applications as disclosed pursuant to the invention.

A further object of the invention is to utilize thermolysis methods to destroy (and beneficially not generate any additional) toxic halogenated organic compounds present in certain components of the waste sources.

A further object of the invention is to utilize thermolysis methods to generate clean, useable fuel gas sources substantially-free or free of halogenated organic compounds (including VOCs).

A further object of the invention is to utilize thermolysis methods to generate Char containing valuable electronic metals, precious metals, glass reinforcement and other materials, all of which are substantially-free or free of halogenated organic compounds (including VOCs).

Other objects, advantages and features of the present invention will become apparent from the following specification taken in conjunction with the accompanying drawings.

BRIEF SUMMARY OF THE INVENTION

An advantage of the invention is the clean and efficient methods, systems, and/or processes for Thermolysis methods to safely and efficiently convert various e-waste sources to a Clean Fuel Gas and Char source. It is a further advantage of the present invention that e-waste sources are converted by destroying toxic halogenated organic and hydrocarbon compounds present therein; clean, useable fuel gas sources substantially-free or free of halogenated organic or hydrocarbon compounds are generated; and Char containing valuable electronic metals, precious metals, glass reinforcement and other materials, all of which are substantially-free or free of halogenated or hydrocarbon organic compounds, are further generated.

In an aspect of the invention, a method for converting an electric and/or electronic waste source to a Clean Fuel Gas and Char source comprises: inputting an electric and electronic waste source into a thermolysis system; undergoing a depolymerization and a cracking reaction of hydrocarbons in the waste source; destroying and/or removing toxic compounds present in the waste sources; and generating the Clean Fuel Gas and Char source. In a further aspect, the Clean Fuel Gas source is used for power to a system or application, the Char source contains recoverable metals, and the Clean Fuel Gas and Char source are substantially-free of halogenated organic compounds.

In an aspect of the invention, a method for converting e-waste sources to a Clean Fuel Gas and Char source is provided and comprises: shredding or grinding an e-waste source to provide a substantially uniform e-waste source having an average diameter of less than 1 inch into a thermolysis system comprising at least one reactor with a process temperature of from about 300° C.-800° C. and a pressure range from about 10 to about 100 millbar, wherein the system is provided indirect heat that is free of oxygen; undergoing a depolymerization and a cracking of hydrocarbons in the e-waste source; destroying and/or removing toxic compounds present in the e-waste sources; generating a Char, wherein the Char is a fine metallic state that is free of halogenated organic compounds and comprises valuable electronic metals, rare earth metals, precious metals, glass reinforcement and/or other materials; separating the metals, glass reinforcement and/or other materials from the Char; and generating a Clean Fuel Gas source from the pyrolytic conversion of hydrocarbons in the e-waste source, wherein the fuel gas source is free of halogenated organic compounds, and wherein from about 3,000 to 19,000 BTUs per pound of e-waste source is generated as the fuel source; and providing at least a portion of the fuel gas source to the method for converting e-waste sources to provide an energy source for such method.

In a further aspect, products produced by the described processes and methods for converting waste sources are provided.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

The patent or application file contains at least one drawing or photograph executed in color. Copies of this patent or patent application publication with color drawing(s) will be provided by the Office upon request and payment of the necessary fee.

FIG. 3 shows e-waste input source in the form of ground e-plastics. FIG. 4 shows e-waste input source in the form of ground printer cartridges.

Figure 1:
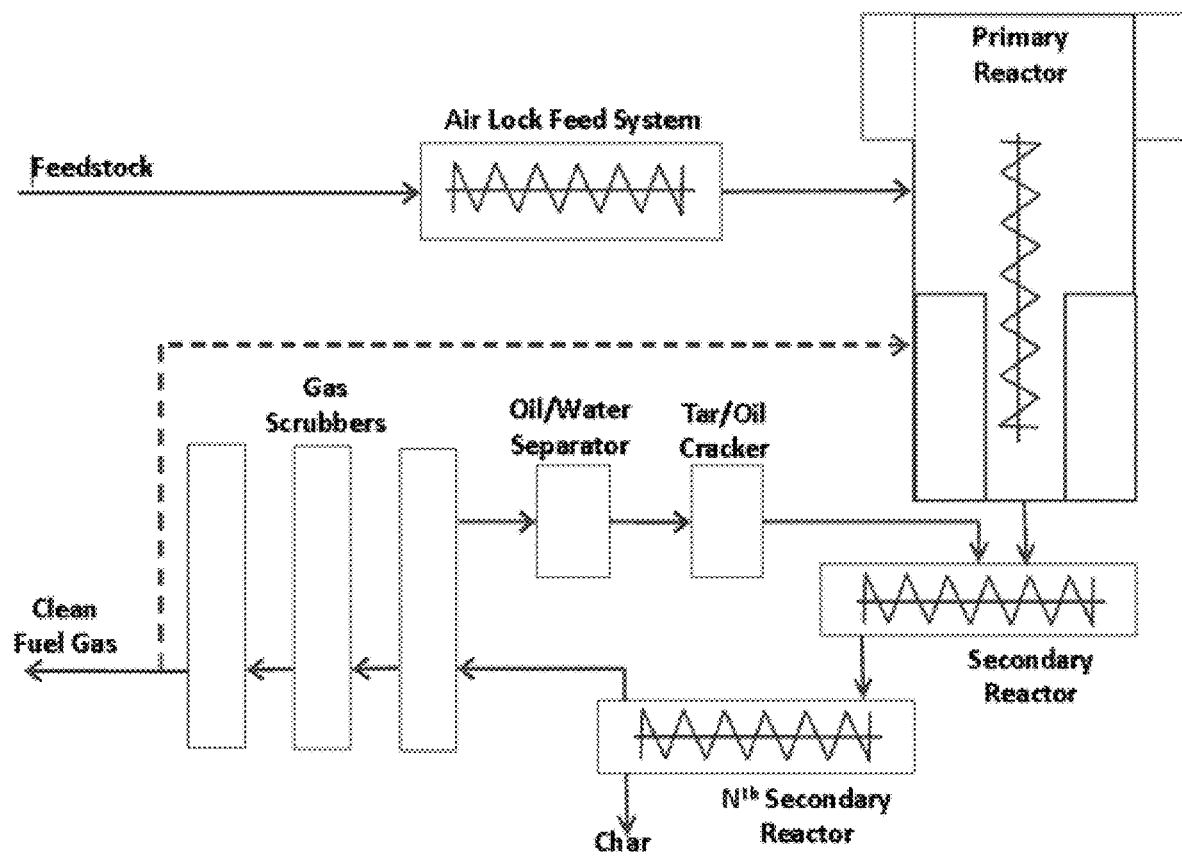
FIG. 1 shows a process diagram for the methods, systems, and/or processes of the present invention.

Various embodiments of the present invention are described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular methods, systems, and/or processes for thermolysis methods to safely and efficiently convert various e-waste sources, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "substantially-free," as used herein may refer to a minimal amount of a non-desirable and/or toxic component in a material, such as a Char generated by the methods, processes and systems of the invention. In an aspect, a material is substantially-free of a defined component if it contains less than a detectable amount of the defined component, or less than about 10 parts per billion (ppb), or more preferably less than about 1 ppb. In an embodiment, Char and fuel gas generated according to the processing of e-waste is substantially-free of toxins, including halogens, having less than about the detection limit of about 10 ppb, or more preferably less than about 1 ppb of the toxin, including halogens. For toxic and/or hazardous materials, free represents an amount below the detection limit of the appropriate material within experimental error. In an aspect of the invention the Char and fuel gas generated according to the processing of e-waste is free of toxins, indicating that there is a non-detectable amount of toxins in the measured source.

The term "substantially-free," as used herein referring to oxygen in the thermolysis methods refers to a minimal amount of oxygen or air. In an aspect, a system is substantially-free of oxygen if it contains less than about 4 wt.-%, and preferably less than about 2 wt.-%.

The term "thermolysis" as used herein is generally referred to as a thermal-chemical decomposition conversion process employing heat to an input source in need of conversion to a Clean Fuel Gas and Char source. Thermolysis refers generally to thermal-chemical decomposition of organic materials at temperatures >300° C. and in some instances in the absence of external oxygen to form gases, tars, and oils and Chars that can be used as chemical feedstocks or fuels. Tars and oils represent groups of volatile organic compounds, viscous liquids, paraffins, waxes, aromatics, aliphatics, fats and other petrochemical based organic mixtures for example. The thermolysis methods disclosed according to the present invention are an advancement over conventional pyrolysis and/or thermolysis methods, which employ fire or a heat source and include an oil as an output. As described herein according to the invention no oil is generated as an output of the thermolysis methods of the present invention. As disclosed in further detail herein, the present thermolysis methods employ at least a reprocessing of any tars and oils. Based on at least these distinctions between the thermal conversion methods, the terms thermolysis and pyrolysis are not synonymous, as thermolysis provides various beneficial improvements not previously achieved by pyrolysis methods and/or conventional thermolysis methods.

The term "weight percent," "wt.-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt.-%," etc.

The methods, systems, and/or compositions of the present invention may comprise, consist essentially of, or consist of the components and ingredients of the present invention as well as other ingredients described herein. As used herein, "consisting essentially of" means that the methods, systems, and/or compositions may include additional steps, components or ingredients, but only if the additional steps, components or ingredients do not materially alter the basic and novel characteristics of the claimed methods, processes and/or systems.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged and configured, constructed and arranged, adapted and configured, adapted, constructed, manufactured and arranged, and the like.

The methods, systems, and/or processes of the present invention relate to thermolysis methods to safely and efficiently convert various e-waste sources to a Clean Fuel Gas and Char source. Beneficially, the methods, systems, and/or processes of the present invention provide significant and unexpected advances beyond conventional thermolysis methods. For example, conventional combustion processes which burn e-waste sources are highly unpredictable and difficult to control. Although advancements in thermolysis have been made in the prior art, the present invention beneficially exceeds the capabilities of known thermolysis methods in converting e-waste sources into valuable outputs which beneficially destroy (and do not generate any new) toxic halogenated organic compounds present in e-waste sources. Moreover, the thermolysis methods of the invention include the use of multiple reactors, reinjection and cracking of any and all tars and oils that are created. As a further benefit, the methods, systems, and/or processes of the present invention generate clean, useable fuel gas sources substantially-free or free of halogenated organic compounds. As a still further benefit, the methods, systems, and/or processes of the present invention generate Char containing valuable electronic metals, precious metals, glass reinforcement and other materials, all of which are substantially-free or free of halogenated organic compounds. Notably, the methods, systems, and/or processes of the present invention do not simply reduce the amounts of brominated compounds and other toxins, instead these are removed (with no additional generation) from the treated e-waste sources while further providing the useful and valuable outputs of the invention defined further herein.

E-Waste Sources

The methods, systems, and/or processes of the present invention relate to of novel process using thermolysis methods too safely and efficiently convert various electrical and electronic equipment (WEEE), including e-waste sources. As referred to herein, "e-waste" sources include, but are not limited to: (i) printed wiring boards (PWB), including electronic circuit boards (ECBs), including the electronic components and wiring attached to the PWB, as well as glass fibers held together with epoxies that contain brominated flame and/or fire retardants (FR), (ii) the e-plastic materials employed along with the PWB, include plastic housings, cases, bases, supports, frames, enclosure, terminals connectors and other polymeric parts, (iii) flat panel displays (FPDs), including steel, e-plastics, aluminum, glass, PWBs and mercury lamps contained therein, and (iv) printer cartridges and/or cassettes, toner cartridges, solvents, and ink-containing modules.

As one skilled in the art will ascertain, e-waste sources according to the invention differ based upon factors including the polymer type, flame and/or fire retardancy of the e-waste source, namely the halogenated flame and/or fire retardants for thermoplastic polymers designed for a particular polymer system employed in the e-waste source. Halogenated flame and/or fire retardants were engineered to match compatibility with a specific polymer system and to meet designed Underwriters Laboratories of the USA (UL) requirements, agency and industry test standards. As a result, there are significant differences among flame and/or fire retardant polymeric materials contained in e-waste sources requiring processing according to this invention. The methods, systems, and/or processes of the present invention unexpectedly provide suitable conditions for the conversion of such diverse e-waste sources into desirable outputs. However, the nature of the e-waste source will impact that particular thermolysis methods, systems, and/or processes of the present invention to convert such e-waste source into a Clean Fuel Gas and Char source.

Without being limited to a particular theory of the invention, additive flame and/or fire retardants are generally formulated for thermoplastic polymers (such as those used in plastic housings and/or cabinetry for electronics, including those plastics containing PWB) are unique from reactive flame and/or fire retardants used in an epoxy backbone of a PWB. Beneficially, the Thermolysis method is suited for processing both types of e-waste sources with modifications to the processing methods, systems and/or apparatuses disclosed herein.

PWB and ECBs Containing Reactive Flame and/or Fire Retardant Polymers in Epoxy Backbones (FR4) as an E-Waste Source In an aspect of the invention, PWBs, including ECBs, are a suitable e-waste source for use according to the methods, systems, and/or processes of the present invention. PWBs contain precious metals, organics, hazardous halogenated flame and/or fire retardants (also referred to as flame and/or fire retardant polymers), and fiberglass. ECBs are an e-waste source which include the electronic components and wiring attached to the PWB, such as glass fibers or fabric held together with epoxies that also contain halogenated flame and/or fire retardants. The use of the term PWBs employed herein this description are further understood to include the ECBs.

In an aspect, PWBs processed according to the invention enables the metals in PWBs to be recovered by refining (instead of smelting) or chemical or electrochemical separation for individual metals, and further recovers fiberglass, each of which has the further benefit of eliminating any toxic components (such as dioxins and furans) from the generated Char containing the metals. Moreover, the refining and removal of fiberglass further reduces the amount of Char that contains the precious metals. Beneficially, the metals are recovered substantially in their original form and most have not been melted, which preserves the value of the metals. In an aspect of the invention, at least 50% recovery of the metals, including precious metals (e.g. gold, silver, palladium), electronic metals (e.g. copper, aluminum), and rare earth metals are recovered from the Char through separation methods, preferably at least about 55%, preferably at least about 60%, preferably at least about 65%, preferably at least about 70%, preferably at least about 75%, preferably at least about 80%, preferably at least about 85%, preferably at least about 90%, or most preferably at least about 95%. As referred to herein, "separation" means the division of the content or matter—in this case the metals in the char—into constituent or distinct elements such as gold, palladium etc. These and other benefits of processing PWB e-waste sources according to the invention are disclosed here.

In an aspect of the invention, reactive flame and/or fire retardant polymers used in an epoxy backbone of a PWB are a suitable e-waste source for use according to the methods, systems, and/or processes of the present invention. As referred to herein, an epoxy is a crosslinked matrix where the flame and/or fire retardant groups are locked in the polymer matrix, such that the halogenated group (such as bromine) thermally stabilizes the epoxy polymer during high heat operations, the pendant halogenated group (such as Br-groups) protect epoxide linkages from chemical, moisture and oxidation during PWB service life, and the halogenated group (such as bromine) is released only with direct open flame and/or fire or hot wire exposure (such as from shorted surface mount devices). E-waste sources employing reactive flame and/or fire retardant polymers in an epoxy backbone of a PWB generally do not use antimony (Sb) or any other specific synergist for electrical reasons.

Circuit boards containing an FR4 epoxy board with attached electronic devices and components are a commonly found e-waste source. As an example, brominated epoxy resins are used for FR4 laminates used as circuit boards (PWB), encapsulation compounds for coating devices and circuit components, and sealants or putties to protect electronic devices on boards or within the electronic housings. In this e-waste source, tetrabromobisphenol A (TBBPA), the bromine containing molecule as shown by the following formula for tetrabromoBPA-epoxide, for epoxy, also may be found in polybutylene terephthalate (PBT), nylon and urethanes as found in e-waste sources according to embodiments of the invention:

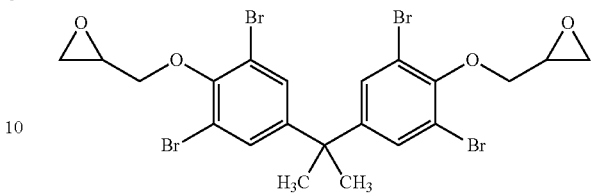

is reacted into the epoxy polymer backbone forming a polymer. The bromine atoms from the TBBPA protect the epoxy chemical linkages from chemicals used in board processing, increase thermal resistance properties of the material, hydrolytic stability and resistance to moist environments and provide flame and/or fire spread protection from surface wires and mounted devices. TBBPA, as an exemplary FR4 PWB laminate e-waste source contains from about 16-20% bromine (UL requirements for flammability and hot wire ignition testing). FR4 laminates contain 40-60% woven glass matt, resulting in bromine content of 8-12% in the FR4 laminate. This bromine content in the form of bromine atoms on the TBBPA molecule are released when exposed to a direct flame and/or fire situation to extinguish the flame and/or fire source (such as associated with short circuits or overloads on the circuit board). As a skilled artisan will ascertain, the bond energy maintains the bromine atom and the epoxy resin stable during elevated operating conditions (such as solder bath processing or other board processing processes) without releasing the corrosive bromine ions. UL requirements call for applications that have a direct 110-220 volt electrical connection for either continuous operation or charging operations to classify as flame and/or fire retarded. Similarly, the laminate must be UL bulletin 94 V-0 to classify as self-extinguishing As of result of these characteristics of the flame and/or fire retardant polymers, including for example FR4 laminates, there is a benefit to processing the flame and/or fire retardant polymers used in an epoxy backbone of a PWB as a single e-waste source according to some embodiments of the invention.

Thermoplastic Housings as an E-Waste Source

In an aspect of the invention, e-plastics or thermoplastics are a suitable e-waste source for use according to the methods, systems, and/or processes of the present invention. The volume of E-plastics or thermoplastics many of which contain hazardous flame and/or fire retardants is approximately ten times the volume of PWBs as a result of a wide variety of plastics employed. In an aspect, e-plastics or thermoplastics processed according to the invention recovers the energy in the plastics and returns it as a reusable energy source, and further safely decomposes hazardous flame and/or fire retardants without the production of any toxic components (such as dioxins and furans). These and other benefits of processing PWB e-waste sources according to the invention are disclosed here.

In an aspect of the invention, thermoplastic housings many of which contain flame and/or fire retardant polymers used in plastic housings and/or cabinetry for electronics are a suitable e-waste source for use according to the methods, systems, and/or processes of the present invention. Without being limited to a particular type of e-waste processed and recycled according to the invention, it is estimated that globally for every ton of PWB there will be approximately 10 tons of the thermoplastics housing the PWB in need of processing. Accordingly, thermoplastic housings represent a significant e-waste source in need of processing according to the embodiments of the invention.

As referred to herein, flame and/or fire retardant polymers used in housings are an additive halogenated molecule (such as bromine or chlorine) chemically designed to blend with the plastic polymers during compounding. Such flame and/or fire retardant molecules migrate within the polymer matrix during thermal exposure or flame and/or fire combustion. Further the flame and/or fire retardant molecules are compounded with antimony trioxide ($Sb_2O_3$) as a powerful synergist resulting in antimony tribromide ($SbBr_3$) designed to smother a flame and/or fire and form insulating Char on the surface. Overall, such flame and/or fire retardant polymers used in e-waste housings have a plasticizing effect which are known to dilute the physical properties of the polymer instead of improve.

Thermoplastic housings, enclosures, cases and other modules containing flame and/or fire retardant polymers are an abundant e-waste source. For example, brominated flame and/or fire retardants for thermoplastic polymers are chemically designed for each base polymer system. The additive flame and/or fire retardant (FR) molecules are added during the resin compounding process along with other additives, colorants, stabilizers and reinforcements. Exemplary polymers and their applications include: FR-acrylonitrile butadiene styrene (ABS) suitable for high gloss external housings, covers, bezels and doors; Polycarbonates suitable for housings that require physical strength, durability and toughness with desirable appearance; FR-HIPS (High Impact Polystyrene) suitable for housings, covers, enclosure with low end economics and low physical property requirements; FR-Polypropylene suitable for low cost electronic covers or cases that require lower surface appearance; PVC suitable for low cost electronic covers, doors, and housings that have low physical property requirements and low cost pressures; FR-Nylon & PBT suitable for electrical connectors, terminals, wire blocks, sockets, etc. The design of these and other flame and/or fire retardants for thermoplastic housing polymers is focused on not compromising the physical properties of the base polymer while migrating to the surface of the polymer during thermal exposure to be available to combine with antimony trioxide ($Sb_2O_3$) at the critical point of flame and/or fire exposure or ignition point. These halogenated flame and/or fire retardants are compounded with antimony trioxide ($Sb_2O_3$) which acts as a synergist to form the heavy gas antimony tribromide ($SbBr_3$) to choke the open flame and/or fire and cool the combustion site to stop the flame and/or fire propagation.

As of result of these characteristics of the flame and/or fire retardant thermopolymers, there is a benefit to processing the flame and/or fire retardant polymers used in plastic housings, enclosures, cases, cabinetry, and other modules for electronics as a single e-waste source according to some embodiments of the invention.

Flat Panel Displays as an E-Waste Source

In an aspect of the invention, flat panel displays (FPDs) are a suitable e-waste source for use according to the methods, systems, and/or processes of the present invention. FPDs as an e-waste source include various components such as steel, plastic, aluminum, glass, boards and hazardous mercury lamps contained therein. In an aspect, FPDs processed according to the invention safely extracts and eliminates mercury and hazardous flame and/or fire retardants without the production of any toxic components (such as dioxins and furans). These and other benefits of processing FPD e-waste sources according to the invention are disclosed here.

In an aspect, the handling of mercury lamps contained within FPDs according to the methods of the invention do not require the time-consuming and potentially hazardous step of an initial removal or separation of a mercury lamp from within the FPDs. This is a significant benefit as an FSD may contain up to 20 or more glass ampules each containing 1-20 mg of mercury and sealed with as many as 60-70 screws within the FPD enclosure to protect the mercury ampules. This results in a time consuming process for the work to disassemble under HAZMAT conditions. Instead, employing the methods, systems, and/or processes of the present invention obviates the need for the step and instead processes the e-waste source within the closed, oxygen-free system capable of removing toxins, including mercury. Without being limited to a particular mechanism of action, the thermolysis methods beneficially vaporize any mercury and reacts with halogens in the scrubbers to from mercury halides, which can be safely removed from the internal waste water treatment system.

Printer Cartridges and Cassettes as an E-Waste Source

In an aspect of the invention, printer cassettes and/or ink cartridges are a suitable e-waste source for use according to the methods, systems, and/or processes of the present invention. Such printer cassettes and/or ink cartridges include thermoplastics, solvent and carbon black/ink. In some cases, these thermoplastics also include halogenated flame and/or fire retardants. Beneficially, the solvent provides a high level of conversion potential and carbon black in the ink may further be recovered and re-used.

Combinations of e-Waste Sources

In an aspect of the invention, a combination of any of the aforementioned electrical and electronic equipment, including e-waste sources, may be processed in a combined processing according to embodiments of the invention.

Thermolysis Methods

The methods, systems, and/or processes of the present invention relate to thermolysis methods to safely and efficiently convert various e-waste sources to gas/vapor mixtures and carbonaceous materials, namely a Clean Fuel Gas source and a Char that contains various metals, precious and otherwise. In an aspect, the gas/vapor including halogens are cleaned and removed as disposable salts. In a further aspect, any mercury is vaporized in the reactors of the system. The metals are recovered substantially in their original form and most have not been melted. As a result of the methods described herein, a clean Char source and fueled gas are the only products of the system.

As referred to herein the thermolysis methods employ a continuous, oxygen-free thermal process of e-waste sources using heat energy. Beneficially, the methods, systems, and/or processes of the present invention convert the e-waste sources by destroying and not generating additional toxic halogenated organic compounds present in e-waste sources. As a further benefit, the methods, systems, and/or processes of the present invention generate clean, useable fuel gas sources substantially-free or free of halogenated organic compounds. As a still further benefit, the methods, systems, and/or processes of the present invention generate a Char containing valuable electronic metals, precious metals, glass reinforcement and other materials, all of which are substantially-free or free of halogenated organic compounds. In an aspect of the invention, at least 50% recovery of the metals, including precious metals (e.g. gold, silver, palladium), electronic metals (e.g. copper, aluminum), and rare earth metals are recovered from the Char through separation methods, preferably at least about 55%, preferably at least about 60%, preferably at least about 65%, preferably at least about 70%, preferably at least about 75%, preferably at least about 80%, preferably at least about 85%, preferably at least about 90%, or most preferably at least about 95%. As a still further benefit, the invention providing for the generation of a Clean Fuel Gas and Char without the formation of (along with the destruction of) halogenated compounds beneficially prolongs the life span of the systems employed for the thermolysis methods. Without being limited according to a particular mechanism, the reduction of formation of halogenated compounds, such as hydrogen bromide which is known to form hydrobromic acid in solution with water, reduces the corrosive damage caused to the systems, such as valves, filters, reactors and the like.

In an aspect the systems and apparatuses utilized for the methods and processes of the present invention includes at least the following components as substantially depicted in FIG. 1, including: a feedstock input, airlock, at least one reactor (and preferably a series of reactors), gas scrubbers, tar/oil crackers (or may be referred to as cracking reactor), collection tanks for Char, and output for Clean Fuel Gas. Additional optional components may include for example, a carbon removal unit for removal of carbon from the Char. Modifications to these systems and apparatuses, including as described herein, are considered within the level of ordinary skill in the art based upon the description of the invention set forth herein.

In an aspect the methods, systems, and/or processes of the present invention include the steps as substantially depicted in FIG. 1, including the following processing steps: shredding, chopping and/or grinding of the e-waste input; a reaction or series of thermolysis reactions in a substantially oxygen-free continuous, low pressure thermolysis process with indirect heating; employing more than one reactor for the thermolysis reactions; separation of Char; a tar and oil reprocessing or cracking step; and scrubbing of the fuel gas.

The methods, systems, and/or processes of the present invention may optionally include one or more of the following steps: separation of e-waste sources; drying the e-waste input, removing any valuable components from an e-waste source; extraction of metals or other components from the ground and/or shredded e-waste input; separation step and additional gas scrubbers; collection and separation of components from the Char (e.g. carbon, metals).

The methods, systems, and/or processes of the present invention can be carried out in a variety of apparatus for thermolysis. An exemplary device or series of reactors, further including oil and other separators, char/oil separators, gas scrubbers, evaporators, and the like are shown for example in U.S. Patent Publication No. 2014/0182194, which is incorporated herein by reference in its entirety.

Figure 2:
FIG. 2 shows a depiction of e-waste (PWBs) suitable for processing according to the methods, systems, and/or processes of the present invention.
Figure 3:
FIGS. 3-4 show photographs of e-waste input (PWBs) having been ground according to an initial processing step according to the methods, systems, and/or processes of the present invention.
Figure 4:
Figure 5A:
FIGS. 5-6 show photographs of e-waste inputs, including whole plastic material (FIGS. 5A, 5B, 5C), including multiple types of large e-plastic waste inputs (FIG. 5A), a plastic computer monitor enclose (FIG. 5B), and miscellaneous e-plastic printer enclosures (FIG. 5C), and mixed plastic material (FIGS. 6A, 6B, 6C), including a plastic part noting it is made from ABS (acrylonitrile butadiene styrene) plastic (FIG. 6A), plastic part noting it is made from ABS-FR (fire retardant) plastic (FIG. 6B), and plastic part noting it is made from PC (polycarbonate) plus ABS with FR plastic (FIG. 6C), each for processing according to the methods, systems, and/or processes of the present invention.
Figure 5B:
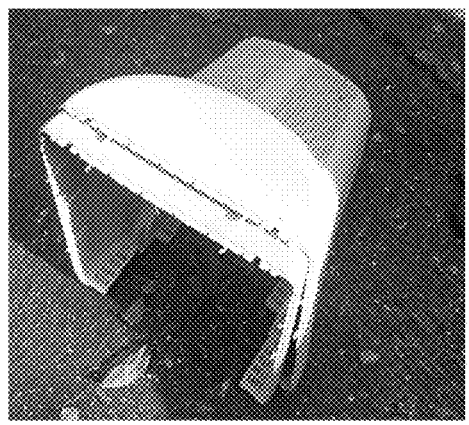
Figure 5C:
Figure 6A:
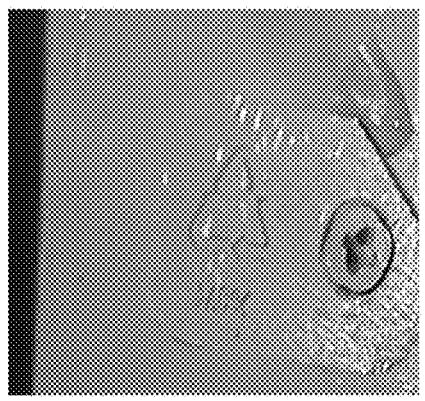
Figure 6B:
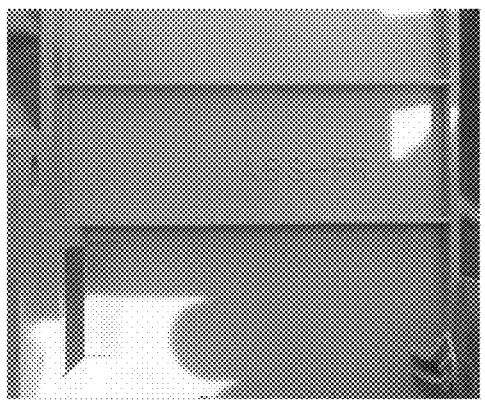
Figure 6C:
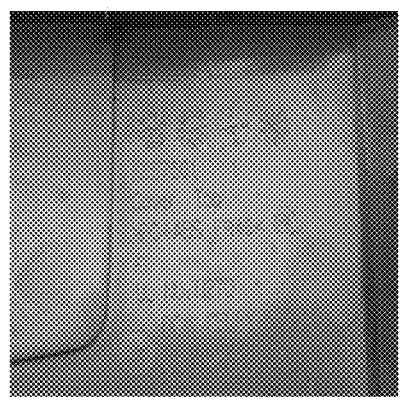
Figure 7:
FIG. 7 shows a photograph of the whole plastic material having been ground according to an initial processing step according to the methods, systems, and/or processes of the present invention.

In an aspect the invention includes an initial optional step of separating e-waste sources for processing according to the invention. In an aspect, one or more types of e-waste may be separated for independent processing according to the methods of the invention. For example, PWBs may be removed from the thermoplastic housings containing the PWBs and separated as e-waste input sources for processing thereafter. In an embodiment, the separated e-waste input sources can be processed using separate reactor systems or may be processed using the same reactor systems in different batches. As shown in FIG. 2, various e-waste sources (as depicted PWB) may be processed according to an embodiment of the invention. As shown in FIG. 3, various e-waste sources (as depicted e-plastics) may be processed according to an embodiment of the invention. As shown in FIG. 4, various e-waste sources (as depicted printer cartridges) may be processed according to an embodiment of the invention. As shown in FIGS. 5-7, various e-waste sources (as depicted plastic materials, including whole plastic and mixed plastic) may be processed according to an embodiment of the invention.

In an aspect the invention includes an initial optional step of removing any valuable components prior to a shredding and/or grinding phase. For example, in an aspect, circuit boards may be removed from plastic materials (such as keyboards, laptops, iPhones/iPads, etc.) prior to the shredding and/or grinding of the e-waste source.

In an aspect, the invention includes an initial shredding, chopping and/or grinding step of the e-waste source, each of which may be referred to herein as shredding and/or grinding. The scope of the invention is not limited with respect to this initial processing step to reduce the size of the e-waste and provide a substantially uniform input source. In an aspect, the e-waste source can be placed directly into a grinder or shredder. In an aspect, the grinding and/or shredding step provides substantially uniform pieces of the input source. In an aspect, the grinding and/or shredding step provides pieces of the input source having an average diameter of less than about 2 inches, preferably less than about 1 inch (as shown in FIGS. 3-4 and 7), or in some aspects, to less than about 0.5 inches. In an aspect, the shredding and/or grinding can include a first coarse step followed by a fine shredding and/or grinding step. In an alternative aspect, the shredding and/or grinding can include a single processing step.

Various shredding and/or grinding techniques may be employed according to the invention to provide the e-waste input source in a desirable size or form for processing. In a preferred aspect, the e-waste source, such as a PWB, is ground and/or shredded to a size of less than about 1 inch to provide a substantially uniform input source. In a further preferred aspect, the substantially uniform input source is combined with any dust or other debris from the shredding and/or grinding step that is recovered for processing according to the methods of the invention.

Beneficially, according to the invention a variety of e-waste sources can be processed according to the invention without substantial extraction steps to remove or separate various components for distinct and separate processing. This is a significant benefit over processing systems and techniques of the prior art requiring substantial sorting and separation of components. As set forth in the 2013 WIPO report titled E-Waste Recycling Technologies, "the general intent at each step is that complex materials should be sorted and separated as much as possible into similar types of materials, e.g., steel with steel, aluminum with aluminum, copper with copper, etc. At each step a more concentrated output material becomes a more valuable input into another process, until a material is ready for the market as a new material." The present invention does not require such extensive separation into similar types of materials for the processing of e-waste sources.

In an aspect, the invention includes an optional extraction step for the removal of certain metals from the ground and/or shredded e-waste source input. In an aspect, a step for extraction of metals immediately follows the shredding and/or grinding of the e-waste source. As referred to in this step, the extraction of metals includes ferrous metals and non-ferrous metals (e.g. aluminum).

The removal step may include any techniques known to those skilled in the art to which the invention pertains, including a combination of mechanical and/or manual removal. In an aspect, the separation may include the use of magnet separators, including magnetic and high magnetism separators, for the attraction and removal of ferrous metals. In a further aspect, the use of eddy current can be used to remove metals, such as copper and aluminum. In an aspect, the separation may include the use of electrostatic separation. In an aspect, the separation may include the use of specific gravity separation. In an aspect, the separation may include the use of an air or fluid sorting device In an aspect, the invention involves a reaction or series of thermolysis methods and reactions in a substantially oxygen-free continuous, low pressure, thermolysis process using heat energy. In an aspect, low pressure includes from about 10 to about 100 millibar, or any range therein. In an aspect, the invention involves an oxygen-free continuous, low pressure, thermolysis process in a reactor or series of reactors. As referred to herein, the oxygen-free process in the reactor(s) does not include air or oxygen in contact with the e-waste input source. Beneficially, as a result of the reduction and/or elimination of oxygen from the methods, systems, and/or processes of the present invention, the e-waste input sources are not exposed to flame and/or fires or plasma source and therefore do not form polycyclic aromatic hydrocarbons (PAHs), halogenated dibenzodioxins, halogenated dibenzofurans, biphenyls, and/or pyrenes, or other halogenated organics In an aspect, the total aggregate composition of the e-waste sources comprising up to 10% halogen content are processed according to the methods, systems, and/or processes of the present invention without the creation of PAHs, halogenated dibenzodioxins, halogenated dibenzofurans, biphenyls, and/or pyrenes.

In a further aspect, the invention further includes the destruction of toxins, namely halogen compounds in addition to not generating any toxins as mentioned above. In an aspect, the methods destroy aliphatics, aromatics, and polycyclic aromatic hydrocarbons, halogenated dibenzodioxins, halogenated dibenzofurans, biphenyls, pyrenes, chlorofluorocarbons, etc. Metals such as cadmium, lead, antimony, arsenic, beryllium, mercury, nickel and other organic compounds present in the e-waste source are recovered essentially in their original state.

In an aspect, the invention employs the substantially oxygen-free or oxygen-free continuous, low pressure thermolysis process with supply of heat energy. Thermolysis methods are known to employ different methods and amounts of heat energy, including for example: Low temperature thermolysis with a process temperature below 500° C.; medium-temperature thermolysis in the temperature range 500 to 800° C.; and melting thermolysis at temperatures of 800 to 1,500° C. According to aspects of the present invention, the substantially oxygen-free or oxygen-free continuous, low pressure thermolysis process applies indirect heating. In an aspect, the heating includes processing the e-waste source input at temperatures of about 400° C.-800° C. Beneficially, the use of a lower temperature thermolysis process places less stress on a reactor(s) (such as steel reactors), requires less energy to run the continuous process according to the invention, and further maintains metals in contact with the system at lower temperature ranges which improves longevity, processing, etc. within a plant facility.

In an aspect, a reactor or series of reactors (also referred to as cascading reactors) allows for the thermolysis processing over the lower range of temperatures from about 400° C. to about 800° C. As one skilled in the art understands, there is not a single processing temperature for an input source according to the invention; instead a range of temperatures within a reactor (or series of reactors) is obtained. For example, within a single reactor the input source within the head of the reactor may be at a higher temperature than the bottom of the reactor. In addition, as one skilled in the art understands, the use of a single reactor may necessitate a higher temperature range, such as from about 600° C. to about 800° C., whereas a series of reactors enables a lower range of temperatures, such as from about 400° C. to about 600° C. In preferred aspects, the reactor(s) employed according to the methods of the invention do not require design for withstanding high temperature/pressure, as the relatively low temperature and pressures are employed (such as on average about 650° C. and ambient pressures of on average about 50 mbar).

The continuous thermolysis process is carried out in at least one reactor to undergo at least partial gasification. Various reactors known in the art can be employed, including for example, rotary drum reactors, shaft reactors, horizontal reactors, entrained-flow gasifiers, fixed-bed gasifiers, entrained-flow gasifiers, or the like. Exemplary reactors are disclosed, for example in, U.S. Publication No. 2014/0182194 and DE 100 47 787, DE 100 33 453, DE 100 65 921, DE 200 01 920 and DE 100 18 201, which are herein incorporated by reference in its entirety. As one skilled in the art will ascertain the number, sequence and scale of the reactors employed according to the invention can be adapted pursuant to the scale and volume of e-waste sources inputted, which are embodied within the scope of the invention.

In some embodiments, a primary reactor employed according to the invention may comprise, consist of or consist essentially of input region with distributor, reactor mixing chamber, high-temperature region, high-temperature chamber, heating jacket chamber with burners, conversion section, inner register, and/or heat transfer register. In exemplary embodiments, a secondary (or tertiary) reactor employed according to the invention may comprise, consist of or consist essentially of gas compartment with dome, high-temperature chamber with vertical conveying device, inner register and outer register, conversion section with conveyor device, heating jacket chamber and/or combustion chamber.

In an aspect, the reactor(s) are jacket-heated. In an aspect, the reactors are vertically and/or horizontally disposed. In an aspect, at least two reactors are employed. In an aspect, at least three reactors are employed. In an aspect, the reactor(s) may optionally undergo agitation. In a preferred aspect, at least one reactor or a primary reactor is vertical with a moving bed design and counter-current flow for the fuel gas along the heated walls into secondary reactors. Without being limited according to an embodiment of the invention, such designs minimize the creation of undesirable tars and fuel oils. In a further preferred embodiment, a moving bed design is further employed for a secondary horizontal reactor which extends the controlled reaction time and temperature of the fuel gas and char from improved solid/gas and gas/gas reactions according to the invention.

The e-waste sources undergo the conversion in the reactor(s) for an amount of time sufficient to provide at least partial conversion and substantially as set forth according to the methods of U.S. Publication No. 2014/0182194. In an aspect, the amount of retention time in a reactor(s) varies from at least about 20 minutes, at least about 30 minutes, at least about 40 minutes, at least about 50 minutes, or at least about 60 minutes as may vary based upon factors including for example the shredded size of the input source which impacts the gasification reaction, and the like.

In an aspect, the pressure in the reactor(s) is held constant within a pressure range from about 10 to about 100 millibar, or preferably from about 20 to about 50 millibar.

In an aspect, the methods further include a tar and oil cracking step. As one skilled in the art appreciates, tars and oils are an unavoidable product of the pyrolysis process, which are a non-heterogenous mixture of olefins and parrafins, which contain tars and hazardous component. These hazardous components include carcinogenic benzene, toluene and chlorinated-brominated components, if PVC and/or flame retardants are present in the plastics feedstock. The pyrolytic oils have a low flash point and are known to be extremely hazardous (often requiring hazardous regulatory permits in various countries).

Beneficially, according to the invention such unavoidably created tars and oils are merely an intermediate and are subsequently cracked. As referred to herein, "cracking" refers to the process whereby complex organic molecules are broken down into simpler molecules, such as light hydrocarbons, by the breaking of carbon-carbon bonds in the precursors. Thus cracking describes any type of splitting of molecules under the influence of heat, catalysts and solvents. Accordingly, tars and oils are not collected or an output of the thermolysis methods of the invention. In an aspect, a further gas converter (cracking reactor) will be employed, such as where higher organic components are further degraded. This removal and conversion of these heavy oils or tars into Clean Fuel Gas is desired to remove these materials which selectively absorb halogenated hazardous substances. In an aspect, the step recycles tars and oils in order to remove the hazardous halogenated compounds. In a further aspect, the tar and oil cracking step has the beneficial effect of creating more clean fuel gas.

In an aspect, the generated tars and oils are processed in the presence of an optional catalyst, such as for example zeolite. In an embodiment, the cracking step separates light and heavy oils, such as disclosed for example in U.S. Patent Publication No. 2014/0182194, which is incorporated herein by reference in its entirety.

In an aspect, the methods may further include an optional cooling step for the gas. In some embodiments, the gas will be cooled due to further processing in a scrubbing stage. For example, a cooled conversion chamber may be in connection with a reactor according to the methods of the invention. In an aspect, a gas at a temperature from about 400° C.-800° C. is cooled to a temperature below about 100° C., or preferably below about 80° C. The gas may further thereafter be cooled to an ambient temperature, such as in an adjacent water scrubber to remove any excess water and/or steam from the gas.

In an aspect, the methods may further include a conditioning step, such as employing and additional gas scrubbers. In an embodiment, gas produced may be further purified following cooling at a gas scrubbing stage, i.e. an alkaline stage (for example, NaOH for the binding of HCl and HBr) and fed to the downstream process.

In an aspect, the invention further includes a cleaning step for the further processing when mercury-containing compounds were included in the processed e-waste source. Elemental mercury will be removed in the water scrubber. Such step may also include the removal of mercury having formed a mercury halide, which may be as an insoluble halogen salt in water which is removed in the scrubber. In an aspect, the mercury halide is scrubbed out in the scrubber and thereafter disposed.

In an aspect, the invention further includes a cleaning step for the further processing of the generated fuel gas. Such step may be referred to as a "wet scrubbing" step. In an aspect, the gas is introduced as a gas flow into a wet scrubber for purification. In an aspect, the gas scrubber(s) separate tars, oils and Char from the product gas flow. In a further aspect, the gas scrubber(s) can further cool the product gas, for example to a temperature below about 80° C. The scrubber(s) may further be employed for a final removal step for any toxic compounds in the fuel gas product.

In an aspect, the produced fuel gas/water vapor mixture enters the gas cleaning, i.e. scrubber system. In an aspect, each reactor line has its own first gas cleaning unit. The gas streams are combined after the first scrubber units and will enter the additional scrubbers afterwards.

In an aspect, the gas cleaning units include or consist of scrubbers, vessels, pumps, oil discharge units and heat exchangers. Water combined with additives, such as for example an alkalinity source (e.g. NaOH) or other source such as limestone for removal of sulfur, which are known to those skilled in the art of incineration technologies. Notably, the heating methods according to the invention are distinct from incineration as external heating is provided. For clarity, the methods of the invention do not employ incineration. Those skilled in the incineration arts understand scrubbing using water containing alkaline materials to remove acidic components are distinct methods. These are used in a closed loop system to clean condensates and contaminants out of the gas stream and to cool the gas down. The condensates contain olefins, aromatics and parafins as solids and water. The standard system includes or consists of five gas cleaning systems. This amount can be reduced or increased depending on the feedstock specifications employed according to embodiments of the invention. The scrubbed components like tar will be the feedstock of the cracking reactors, the light oil fraction of aromatic oil and olefins will be separated from the solids/water and reprocessed in the gasification system and the water will be pre-cleaned and reused.

In an aspect, the invention converts the e-waste sources into a Char source and a Clean Fuel Gas source. In an aspect, the invention will further include a recycling step for the recycling of any oils and tars created from the methods described herein. In an aspect, the recycling of the oils and tars involves cracking them and then reprocessing the shorter chain molecules into a main reactor to be converted into additional Clean Fuel Gas. In a beneficial aspect of the invention, such generated Clean Fuel Gas is suitable for use in maintaining operation of the processes of the invention at a point of use (i.e. facility employing the methods, systems, and/or processes of the present invention).

Figure 8:
FIGS. 8-9 show photographs of Char generated from the e-waste input according to the methods, systems, and/or processes of the present invention.
Figure 9:
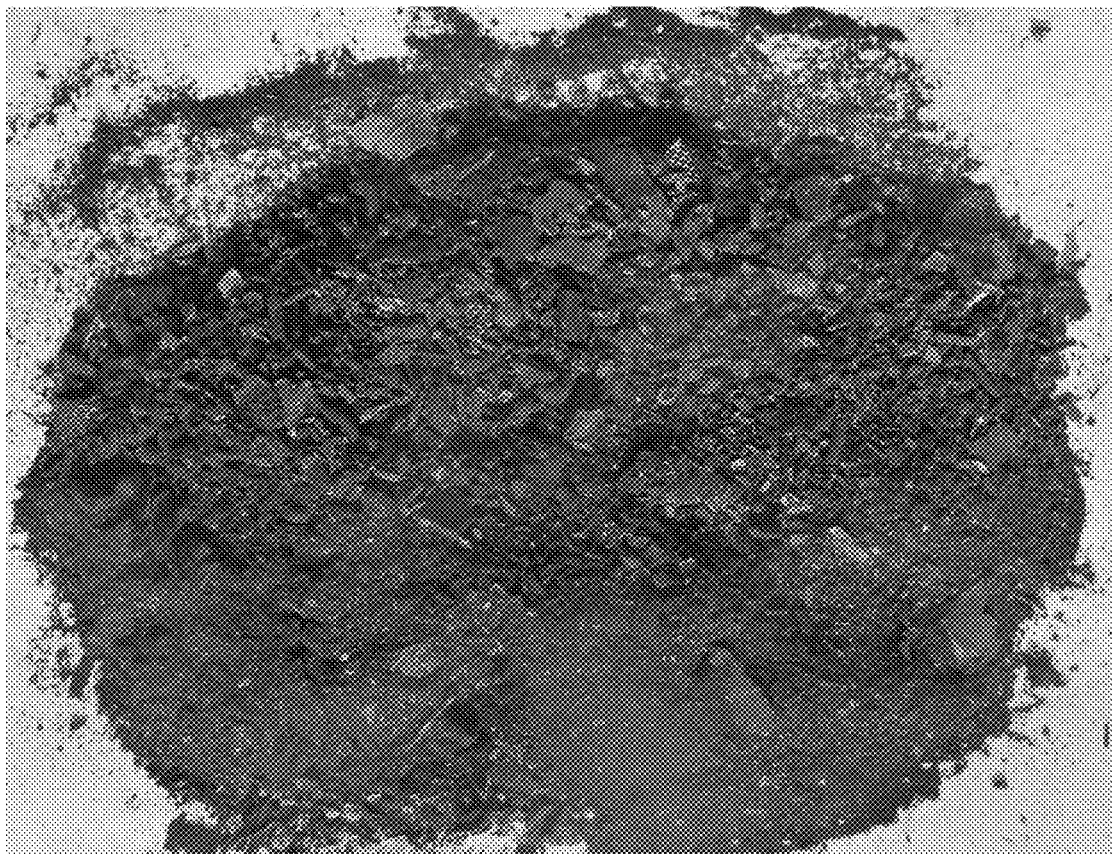
Figure 10:
FIGS. 10-15 show photographs of separated materials in phases of separation according to optional embodiments of the invention from clean Char including: Oversized copper materials (1.3+mm) (FIG. 10), Smaller sized copper and precious metal materials (FIG. 11), additional finer sized copper and precious metal materials (FIG. 12), <300 um sized copper and precious metal materials (FIG. 13), additional finer sized copper and precious metal materials (FIG. 14), and primarily fine carbon material (FIG. 15).
Figure 11:
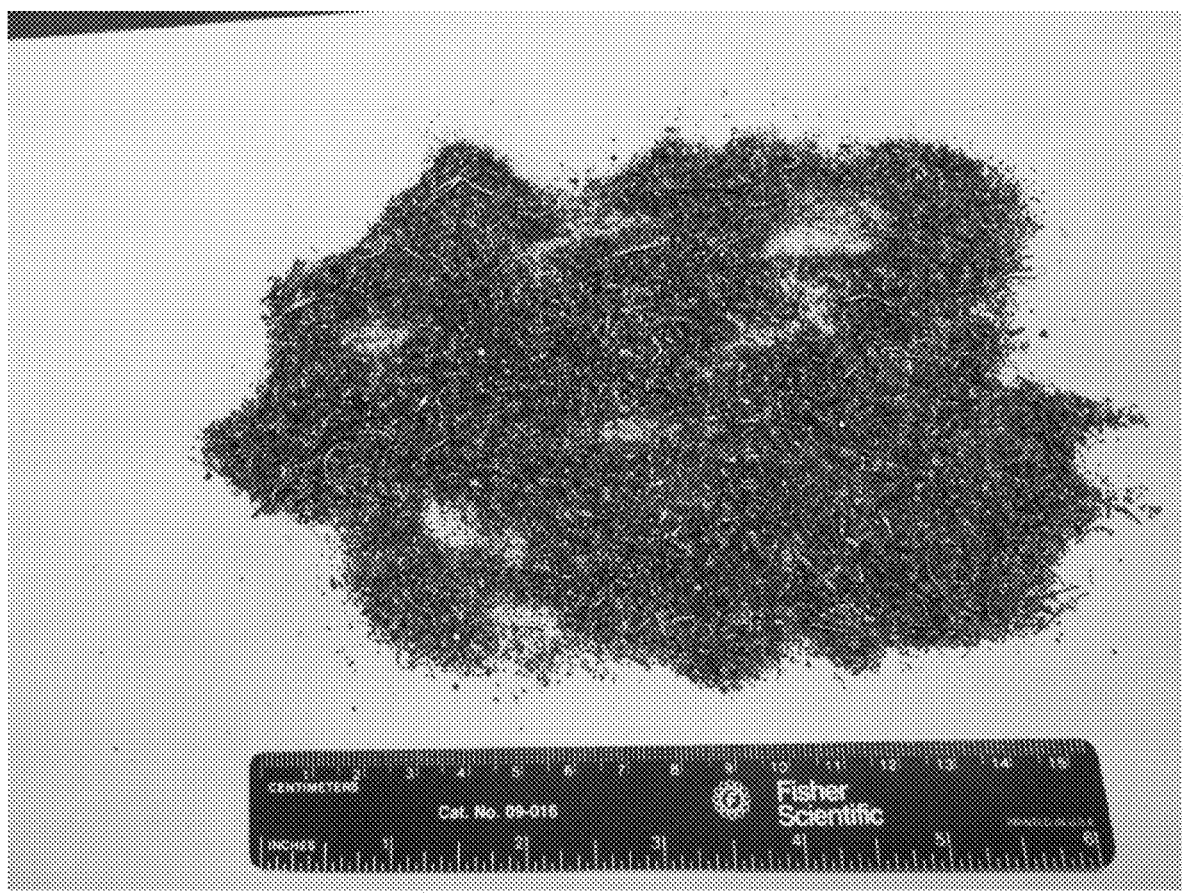
Figure 12:
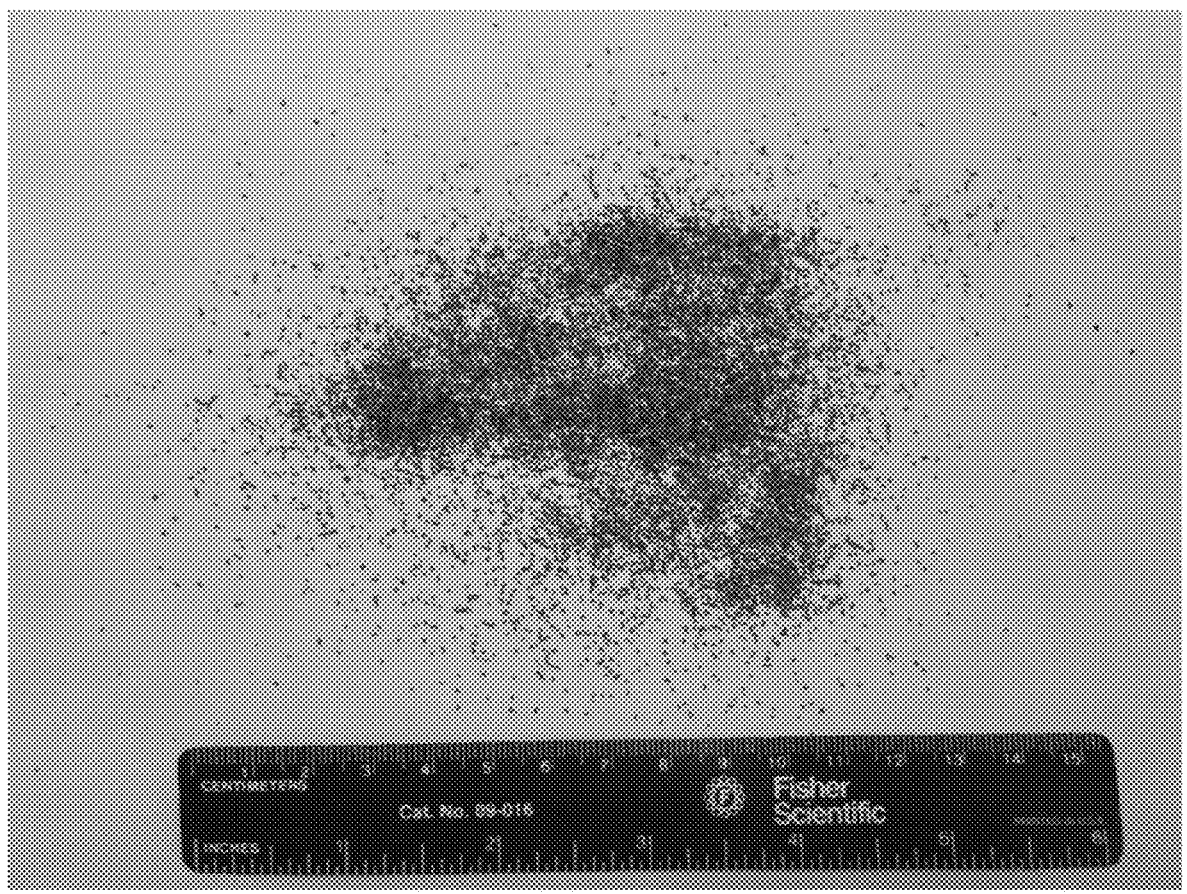
Figure 13:
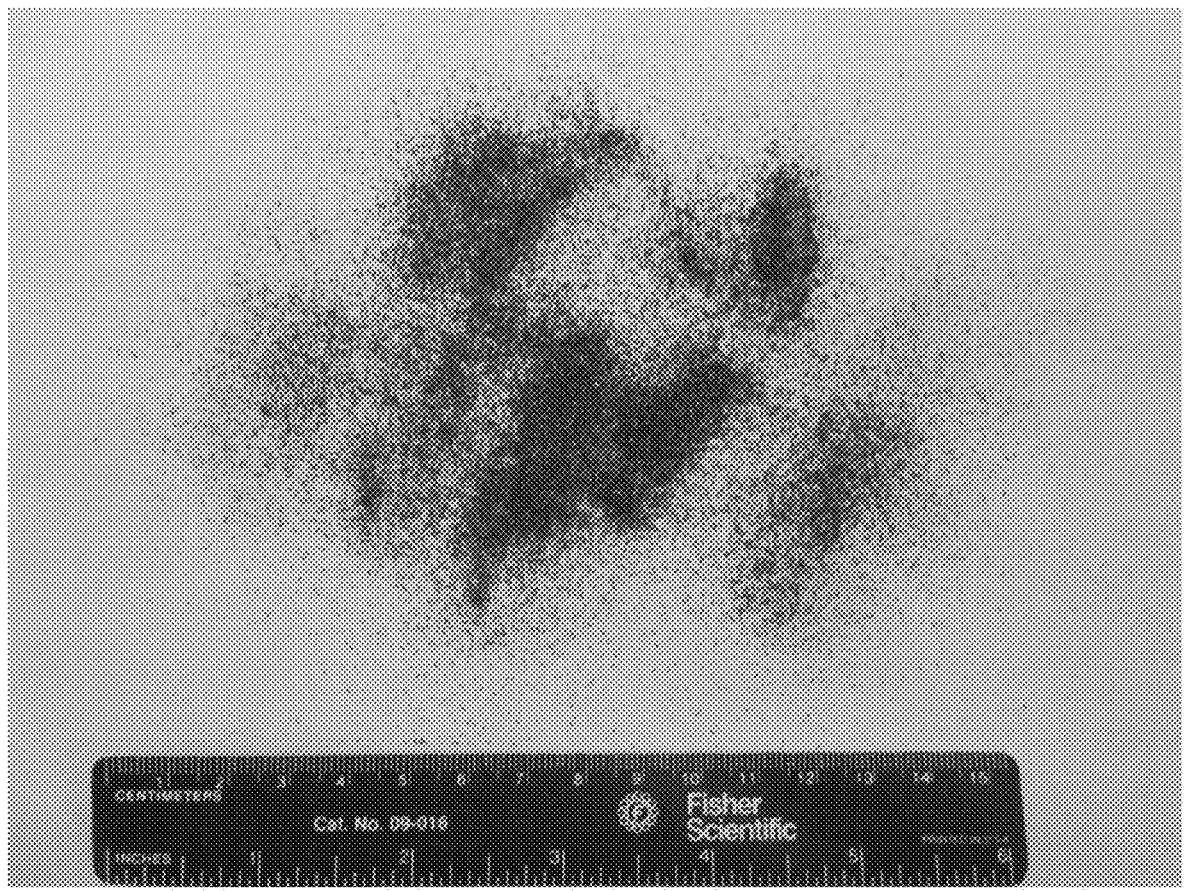
Figure 14:
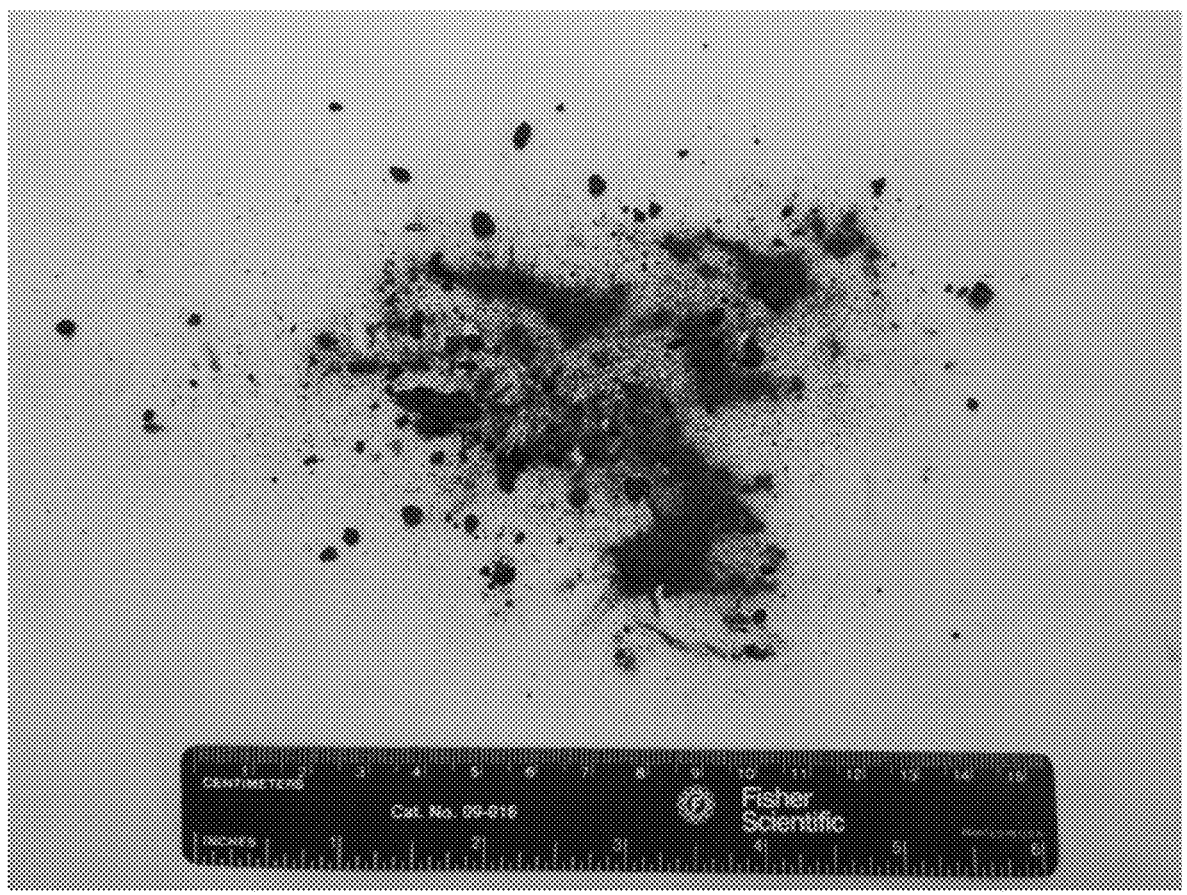

In an aspect, the invention further includes a separation step for the further processing of the generated Char source (as shown in FIGS. 8 and 9). In an aspect, the Char source generated according to the invention comprises metals in a fine metallic state. In a further aspect, the Char source generated according to the invention comprises glass fibers (such as from FR4 boards), carbon particulates/fine matter, metals, precious metals and/or combinations of the same. The Char source will further undergo a subsequent separation step, such as to remove a desired component from the Char as may be accomplished by a variety of commercially-known processes.

In one embodiment, a carbon conversion unit can be employed to remove carbon from a Char source. Beneficially, the generated Char source has undergone about a 40%, 50% or greater reduction (weight basis) as a result of the thermolysis processing according to the invention which removes the organics and thereafter can be further separated the remaining components. In an aspect it is desirable to remove additional carbon from the Char source, such that there is a great than 50% (weight basis) reduction of carbon in the Char source. In a preferred embodiment, the carbon is reduced to less than 10% (weight basis). In a preferred embodiment the carbon is removed from the Char source.

In an aspect, the further processing of the Char source can include the use of ozone to convert carbon to a fuel gas (in the form of carbon dioxide or carbon monoxide which thereafter are further processed through the scrubbers). In such an embodiment, ozone can be added to a chamber containing the Char (at either room or ambient temperature or at elevated temperatures, such as about 100° C. to about 300° C.). Such a chamber could be one of the reactors or a separate chamber. In an aspect, the use of ozone to convert carbon to a fuel gas obviates the use of a cold incineration process.

In an aspect, the further processing of the Char source incinerates the carbon in the residue at controlled temperatures, such as from about 300° C. to about 500° C. The air supply is temperature controlled and the whole process can be cooled, such as to a temperature from about 300° C. to about 500° C. Such process is referred to as a cold incineration process). In an aspect, the equipment includes or consists of an infeed screw conveyor, a rotary calciner with flights and register pipes for heat transfer, a cooled exit screw conveyor, exhaust gas cleaning unit with particulate removal and optional scrubbing devices.

In an aspect, the infeed screw conveyor has a conventional design and the temperature of the co-product is the main parameter for its specification. The temperature of the co-product will be increased by indirect heating and controlled air supply before it enters the rotary calciner.

In an aspect, the rotary calciner has a basic design of an elongated drum with two bearings, an inner drum with flights and a central output screw conveyor. Input and output are symmetrical located. The drive is at the head of the rotary calciner. Input and output of the material is done via the shaft and thus gas proof to the atmosphere. A pipe register in two levels inside the drum will cool the process. The material can be transported by the inner flights into the output screw conveyor. The material can be continuously transported through the rotary calciner at a constant temperature and constant cooling. Moreover, carbon oxidizes to $CO_2$ in this process.

In an aspect, the output screw conveyor has a conventional design with a cooling jacket and connected to the storage vessel.

In an aspect, the exhaust gas cleaning module has a conventional particulate removal system and can be optionally equipped with a gas scrubber with solid removal. A fan can be added if necessary before entering the stack.

In an aspect, a separation step is employed to remove the fine metals and/or the glass fibers from the Char. In an aspect, the glass fibers can be separated resulting in a highly concentrated metals/Char mixture. In an aspect, the removal of the glass fibers provides a 2× concentrate metals/Char mixture, or a 3× metals/Char mixture, or preferably a 4× metals/Char mixture. Beneficially, the metals/Char material can be processed in domestic refineries in the processed condition as opposed to requiring off-shore shipment to international smelters. As a further benefit, the metals in Char mixture can be recovered by refining while further removing the fiberglass, such that each component separated from the Char remains substantially-free or free of the toxic components (such as dioxins and furans). Such refining and removal of fiberglass are achieved through known separation methods (such as screen and gravity separation) which are able to separate metals, including precious metals, which are recovered substantially in their original form. Moreover, the separated metals have not been melted in the process, or a majority of the metals have not been melted, which preserves the value of the metals.

In an aspect of the invention, at least 50% recovery of the metals, including precious metals (e.g. gold, silver, palladium), electronic metals (e.g. copper, aluminum), and rare earth metals are recovered from the Char through separation methods, preferably at least about 55%, preferably at least about 60%, preferably at least about 65%, preferably at least about 70%, preferably at least about 75%, preferably at least about 80%, preferably at least about 85%, preferably at least about 90%, or most preferably at least about 95%. Examples of separation techniques includes, for example, mechanical (i.e. shaking) separation, electrochemical processing, or the like. In an exemplary embodiment of the invention, gold in the Char (containing the metals and glass) was recovered at above 90%, above 95% and in most preferred embodiments above 98%. In an aspect of the invention, the extracted metals can be further purified for a desired application of use. Because the precious metals are in their native form and not alloyed, chemical and electrochemical processes can be used to recover them individually by other known processes.

In an aspect, the fuel gas is transported through the gas cleaning system by increasing the pressure, such as to about 100 mbar by ventilation systems. In an aspect, 100 mbar is the limit value for the system employed according to the invention.

In an aspect, the wastewater treatment includes or consists of a physical and biological treatment segment. The wastewater can be discharged after pre-treatment and cleaning.

In an aspect, the safety system transports the fuel gas to a flare in case of an emergency. In an aspect, all the pipelines have valves, which automatically open in case of a power failure. In a further aspect, the connecting pipes to the flare are equipped with burst discs, which will prevent excessive pressure in the reactors and the gas cleaning systems. In case of an emergency, this system will help to shut down the system in a safe manner.

Optional Additions for Enhanced Processing and Efficiency of Thermolysis Methods The methods of the present invention are suitable for combination with additional inputs to further maximize the efficiency of the methods and systems employed. It is known that power generation equipment is designed to perform at best efficiencies for converting the supplied fuel into power at a specified range of fuel load. This range for gas turbines and gas engines is generally in the 80% to 100% fuel gas capacity of the selected gas turbine or gas engine. Efficiency is determined as thermal energy required in the fuel gas to generate power and provided by the vendors in BTU/kWh valid for the specified range of 80% to 100% capacity fuel gas load of their equipment. As one skilled in the art will ascertain, fuel gas loads of <80% will decrease the efficiency of converting the thermal energy of the fuel gas into power.

According to optional embodiments of the invention, the clean fuel gas source output according to the methods of the invention can be further enhanced, such as measured on a cfm (cubic feet per minute) and the heating value of the clean fuel gas source constantly controlled in BTU/cuft. The quantity and the heating value of the clean fuel gas source are dependent on the feedstock properties processed according to the embodiments of the invention. A homogenous feedstock Input into the reactors will yield a consistent clean fuel gas source Output for both parameters: cfm and heating value per cuft supplied to a gas turbine/engine. Fluctuations in the feedstock will change the quantity of the generated clean fuel gas source and its heating value per cuft. Accordingly, the methods of the invention may be further controlled for the output of clean fuel gas source by adding Natural Gas in a pre-mixing storage vessel with the clean fuel gas source before supplying it as fuel, such as to a gas turbine/engine.

In an aspect, the addition of natural gas (such as methane) to the clean fuel gas source output of the invention has various advantages. The added Natural Gas can equalize any fluctuations in the gas flow quantity of the clean fuel gas source and the blend of the two combined gas streams will ensure the necessary supply of total gas to a gas turbine/engine to achieve the 80% to 100% fuel gas load for optimized performance of the power generation equipment. In addition, adding Natural Gas to the available clean fuel gas source capacity can increase the total capacity of power generation at a project site. Still further, substituting the clean fuel gas source by Natural Gas during maintenance periods of the systems employed provides a redundancy in power generation for the duration of the shut-down of the system.

Additional sources of fuel can be utilized in the methods of the invention, including those listed below as "Additional Fuel Sources" with the exemplary BTU for each input source.

Generated Outputs of the Thermolysis Methods

In an aspect, the methods, systems, and/or processes of the present invention convert the e-waste sources into a Char source and a Clean Fuel Gas source. Beneficially, the hydrocarbon materials from the e-waste input are converted to the Clean Fuel Gas while the metals and carbon-coke will be collected as "Char." As a further benefit, any oils and tars created are recycled into the secondary reactor and cracking reactor to be converted into additional fuel gas, such as may be employed to maintain operation of the processes of the invention at a point of use (i.e. facility employing the methods, systems, and/or processes of the present invention).

Char

The methods according to the invention employing the thermolysis methods beneficially provide a processed Char comprising glass fibers (such as from FR4 boards), carbon particulates/fine matter, metals, precious metals and/or combinations of the same. In an aspect, the Char is a non-hazardous material. In an aspect, the Char is substantially-free or free of toxic chemicals. The Char must be cooled down before opening to air to prevent formation of hazardous dioxins and furans (such as for example to less than about 120° C.).

In an aspect, the Char is substantially-free of halogen compounds. In a further aspect, the Char is substantially-free of toxic chemicals and halogen compounds. In an aspect, the Char is free of toxic chemicals, including for example mercury-containing compounds. In an aspect, the Char is free of halogen compounds. In a further aspect, the Char is free of toxic chemicals and halogen compounds.

Fuel Source

The methods according to the invention employing the thermolysis methods beneficially provide a clean fuel source. In an aspect, the fuel gas source is a clean, non-hazardous material. In an aspect, the fuel gas source is substantially-free of toxic chemicals. In an aspect, the fuel gas source is substantially-free of halogen compounds. In a further aspect, the fuel gas source is substantially-free of toxic chemicals and halogen compounds. In an aspect, the fuel gas source is free of toxic chemicals. In an aspect, the fuel gas source is free of halogen compounds. In a further aspect, the fuel gas source is free of toxic chemicals and halogen compounds. In an aspect, the fuel source is substantially-free or free of polycyclic aromatic hydrocarbons (PAHs), halogenated dibenzodioxins, halogenated dibenzofurans, biphenyls, and/or pyrenes.

In an embodiment, the fuel gas generated is utilized for heating the reactor(s) for the system and methods of the thermolysis methods of the invention. In an aspect, the heat for the reactor(s) is supplied by about 10-50% of the generated fuel gas, about 10-40% of the generated fuel gas, or about 20-30% of the generated fuel gas.

In an embodiment, the fuel gas generated has a composition as set forth in the Tables in the examples.

In an aspect, the fuel gas is a superior product as a result of no air or external oxygen introduced into the reactors, such as is common in pyrolysis and/or partial oxidation systems.

In an embodiment of the invention the thermolysis of e-waste sources contain from about 3,000 to about 19,000 BTUs per pound of e-waste, producing a Clean Fuel Gas as an energy source. As one skilled in the art will ascertain based on the disclosure of the invention set forth herein, differences in e-waste sources will impact the BTUs per pound. In an aspect, a thermoplastic housing e-waste source may include, for example, from about 14,000-16,000 BTUs per pound.

According to still further aspects, various waste sources will provide the following estimated BTU/pound:

| HIPS | 17,800 |
| FR HIPS | 15,850 |
| ABS | 16,350 |
| FR-ABS | 14,800 |
| FR PWB Laminate | 5,140 |
| PMMA-Acrylic | 10,750 |
| Composite Resins | 12,850 |

In an aspect, the heating value of the generated fuel gas source will vary accordingly based on the type e-waste input source. For example, in a non-limiting embodiment, the heating value of fuel gas generated from the following input sources according to the data generated in the Examples is approximately 400 Btu/ft$^3$ to 800 Btu/ft$^3$. In other aspects the heating value can be modified based on the inputs to provide ranges from about 200 Btu/ft$^3$ to about 1500 Btu/ft$^3$ or from about 500 Btu/ft$^3$ to about 1000 Btu/ft$^3$. In an aspect, notably, the evaluated fuel gas met all emission requirements evaluated.

In an aspect, the generation of the fuel gas is suitable for various applications of use. In an embodiment, the generated fuel source can be used to generate electricity using engines or gas turbines to power a manufacturing plant and/or boilers as a replacement for natural gas and/or electricity. In another aspect, the fuel gas can be used for burners, or steam and electricity production and/or distribution. Many examples of such uses are well known to practitioners of the art.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The disclosure of each reference set forth herein this patent application is incorporated herein by reference in its entirety.

Example 1

Assessment of various e-waste sources according to embodiments of the invention were conducted to review and analyze the mixture of e-waste sources as inputs for processing. The following e-waste sources were analyzed and summaries of the assessment of inputs follows:

1. Keyboard and mouse study:

| E-waste component | Weight (pounds) |
|---|---|
| Dell ® wired keyboard mfg. in 2002 | |
| PWB (power, main, and key boards) | N/A (small) |
| Plastic covers, base, keys & cable | 1.5 |
| Microsoft ® wired mouse mfg. around 2001 | |
| Clam shell enclosure | 0.05 |
| Wire | 0.01 |
| Keyboard | 1.5 |
| Mouse | 0.1 |
| TOTAL | 1.5 |

| Part | Weight (Lbs) | BTU Value/lb. | Total BTUs |
|---|---|---|---|
| ABS Housing | 1.1 | 16,350 | 17,985 |
| PVS Wires | 0.1 | 8,250 | 825 |
| FR-4 PWBs & Mylar | 0.1 | 5,140 | 514 |
| Nylon connectors | 0.1 | 12,500 | 1,250 |
| Plastics Totals | 1.4 | | 20,574 |
| Metal parts & frames | 0.1 | BTU/lb. of Plastics | 14,696 |
| Total Weight lb. | 1.5 | | |
| HIPS Housing | 0.1 | 17,800 | 1,780 |
| PVC Wire & Connector | 0.1 | 8,250 | 825 |
| FR-4 PWBs & Mylar | 0.1 | 5,140 | 514 |
| Plastics Total | 0.3 | | 3,119 |
| Copper wire | 0.1 | BTU/lb. of Plastics | 10,397 |
| Total Weight lb. | 0.4 | | |

2. HP Deskjet® 970 CSE study:

| Part | Weight (Lbs) | BTU Value/lb. | Total BTUs |
|---|---|---|---|
| FR-ABS Housing | 9.5 | 14,800 | 140,600 |
| PVC Wires & plugs | 0.5 | 8,250 | 4,125 |
| FR-4 PWBs | 0.5 | 5,140 | 2,570 |
| FR-Nylon connectors | 0.1 | 12,500 | 1,250 |
| Plastics Totals | 10.6 | | 148,545 |
| Metal parts & frames | 2.5 | BTU/lb. of Plastics | 14,014 |
| Total Weight lb. | 13.1 | | |

| E-waste component | Weight (pounds) |
|---|---|
| HP Deskjet ® in jet printer mfg. in 2002 | |
| PWB (power, main, and key boards) | 0.5 |
| Plastic covers, end caps, lids, base, etc. | 9.5 |
| Metal frame, carriage support & brackets | 2.5 |
| Wire harness, connectors & terminals | 0.5 |
| TOTAL | 13.0 |

3. DVD Materials study:

| E-waste component | Weight (pounds) |
|---|---|
| Samsung ® DVD unit | |
| PWB (3 large, 5 small boards | 0.25 |
| Metal housing | 0.70 |
| Polymeric materials combined | 1.4 |
| 45 screws and mounting clips | 0.01 |
| 165 surface mounts and components | 0.1 |
| TOTAL | 2.46 |

4. Linksys® Wireless Router study:

| E-waste component | Weight (pounds) |
|---|---|
| Linksys ® router unit mfg. in 2002 | |
| PWB (power, main, and key boards) | N/A (small) |
| Plastic covers, base, keys and cable | 1 |
| Wires and antennas | 0.2 |
| TOTAL | 1.2 |

| Part | Weight (Lbs) | BTU Value/lb. | Total BTUs |
|---|---|---|---|
| FR-ABS Housing | 0.7 | 14,800 | 10,360 |
| PVC Wires & Antenna | 0.2 | 8,250 | 1,650 |
| FR-4 PWBs | 0.1 | 5,140 | 514 |
| FR-Nylon connectors | 0.1 | 12,500 | 1,250 |
| Plastics Totals | 1.1 | | 13,774 |
| Metal parts & frames | 0.1 | BTU/lb. Of Plastics | 12,522 |
| Total Weight lb. | 1.2 | | |

5. Flat Screen Display (FSD) study:

| E-waste component | Weight (pounds) |
|---|---|
| Dell ® E178 FPc 17 inch LCD display mfg. in May 2008 | |
| PWB (power, main, and key boards) | 0.5 |
| CCFL (cold cathode fluorescent lamp) 2 glass lamps | N/A (small) |
| Plastic back covers | 1.0 |
| Metal frame, backing and support brackets | 3.5 |

-continued

| E-waste component<br>Dell ® E178 FPc 17 inch LCD display mfg. in May 2008 | Weight (pounds) |
|---|---|
| Base and support (metal and polycarbonate) | 2.5 |
| Wires harness, connectors and terminals | 0.5 |
| TOTAL | 8.0 |

| Part | Weight (Lbs) | BTU Value/lb. | Total BTUs |
|---|---|---|---|
| FR-ABS Housing | 4.4 | 14,800 | 65,120 |
| PVC Wires & plugs | 0.5 | 8,250 | 4,125 |
| FR-4 PWBs | 0.5 | 5,140 | 2,570 |
| FR-Nylon connectors | 0.1 | 12,500 | 1,250 |
| Acrylic screen | 0.2 | 10,750 | 2,150 |
| Plastics Totals | 5.7 | | 75,215 |
| Metal parts, frames & CCFL | 2.5 | BTU/lb. Of Plastics | 13,196 |
| Total Weight lb. | 8.2 | | |

Example 2

Systems and apparatus for processing e-waste sources. Apparatus and processing system for PWBs were evaluated for the assessment of product features and material balances as disclosed pursuant to the embodiments of the invention. The target of the test was to prove the technical capabilities of a plant with a continuous feed of the delivered PWBs and to yield specific product and operating parameter for further evaluation. The methods according to the invention were evaluated to confirm gas output having a suitable composition with high methane, hydrogen and carbon monoxide content for further usage, and hydrogen bromide or hydrogen chloride neutralized in the gas scrubbers with sodium hydroxide. The methods according to the invention were evaluated to confirm complete destruction of dioxins, including dioxin content in the Char as non-detectable, despite original dioxin content contained in the PWB feedstock. The methods according to the invention were evaluated to confirm complete destruction of VOCs and other toxic components, along with the measurement of any potentially hazardous components and VCOs to assess suitability of the processes for use in factories. The methods according to the invention were evaluated to assess ability to collect metal particles from the Char through mechanical separation.

Parameters of the test operation. 1000 pounds of PWB feedstock was received and inspected. The feedstock had been shredded to <2 inches for the test. The reactor substantially as depicted in FIG. 1 had been cleaned before the test. Process software and sensors were adjusted to record the operating conditions. The material handling and infeed conditions were adjusted before the test. Technical adjustments for this specific feedstock were implemented as outlined below.

Continuous processing. A continuous plant operation was conducted after heating the system up with controlled feedstock input and product discharge. The operating parameters were adjusted to the requirements of the feedstock. The resulting materials and media were sampled and documented. A total of three gas samples, a feedstock sample and a Char sample were obtained for further analysis. The analysis of the samples was carried out by a certified independent laboratory.

Standard operating conditions of the plant included the following preparation of the plant for the operation: Start-up of the plant: 6:30 am; Feedstock Input: from 11:00 am; Sampling between 13:00 and 15:30 pm; Completion of plant operation: until 18:00 pm; Discharge of products and media, Recording of the yielded products for the mass balance.

General conditions. The feedstock had been shredded and was fed according to the test protocol. The start-up process included the heating of the reactors and the adjustments of the gas scrubbing units and adjacent plant components. The operating conditions were adjusted to the test plant as outlined below.

Plant conditions. The plant operation during the test used the standard configuration of the system and used specific adjustments for this feedstock—These adjustments included:

Plant operation with the lower burner only;

Feedstock infeed periodically as infeed chamber emptied;

Reactor conditions with temperatures of 630° C. at the reactor top and 750° C. to 850° C. at the lower parts of the reactor;

Release of the gas from the gas dome to scrubber 1, no direct connection from the reactor head to scrubber 4;

Steam generation via heat exchanger and injection of the steam through special pipelines directly into the reactor head;

Cracker-module for generated condensates was not in operation, because the volume of these oils was too low for an efficient operation; and The operation of the gas scrubbers was carried out without recirculation; Level control in scrubber 1 and 2 by manual adjustments of the correct level; and Control of the oil water separator between the scrubbers and the gas pipeline of the plant during operation.

Special conditions of the test operation. The selected basic operating parameters were continuously monitored and needed only miniscule adjustments. The Infeed volume of the feedstock was increased during the second phase of the test. The feedstock input was continuous—in selected intervals. Due to the high reactivity and fast gasification of the feedstock, a pulsating increase in gas volume and pressure was monitored. This effect had no negative impact for the test operation. An increase of feedstock caused more gas generation and the slight pressure increase in the range of a few millibar had no impact on the test operation.

The water content in the reactor was slightly increased by steam injection, which increased the gas generation due to the chemical balance reactions. The gas volume was constantly measured. The generated gas volume during phases of increased feedstock supply was 30 m$^3$/hr. and above, the average value was ca. 20 m$^3$/hr.

The scrubber operated at normal stationary conditions. The differential pressure was in the range like differential pressure in previous test runs from about 20-50 mbar.

No recirculation and injection of the generated oils from scrubbers 1 and 2. The low amount of oil components was removed from scrubbers 1 and 2 and collected.

The level control of the media during operation were adjusted constantly to its range level. Media in the first scrubber: oil, Media in the following scrubbers: water with additives. All generated media were removed after the test and measured for the mass balance.

No special technical adjustments were necessary during the test operation from the plant conditions described above. No technical failures occurred. The plant operated perfectly stably and its capability proven to process this feedstock.

Summary of apparatus and process set-up. The feedstock reacts quickly in the main reactor at these temperature conditions and gasifies rapidly. This gasification profile was monitored by the pressure increase shortly after the feedstock was fed into the system. The observed pressure increase is not critical and can be equalized by a more constant feedstock input for a commercial size unit. Beneficially, the gasification and reaction speed of the tested feedstock described herein enables a high throughput volume. The generated gas is piped from the reactor into the gas scrubbing units, which remove the condensates from the gas stream. The condensates are then collected in scrubber 1 and 2 and their viscosity is suitable for reinjection into the process as a fuel source. Residual tars are not left over in the scrubbers.

Various operational parameters were adjusted including: throughput volumes for the Infeed screw conveyors; adjustments of the steam injections to balance out the reactions in the reactor; reactor temperatures; volume of feedstock input; and residence time dependent on Char removal. With these adjustments and the set-up described a stable plant operation was achieved.

Example 3

Exemplary plant operation for PWB feedstock processing. Following the assessment of the apparatus and systems set-up in Example 2, the plant operations were utilized to process e-waste feedstock.

The delivered feedstock material had been shredded to <2" for the test run and continuously fed into the plant in short intervals. Steam was injected, condensates were removed from scrubbers 1 and 2 and Char removed from the Char screw conveying unit.

The infeed specifications of the screw conveyors for this material which had not been previously processed was tested during start up and decreased the infeed volume shortly during Phase 1. The infeed volume was also decreased later during the test, because the temperature in the Char collection drum increased rapidly and more time was needed to cool down the Char. The cool down period is necessary to avoid chemical reactions outside of the plant configuration. The delay in the temperature cool down was caused by the heat capacity of the Char—metal mixture of this specific feedstock. The infeed rate depends on the design of the system and is a parameter that is optimized.

TABLE 1

Summary test operations

| Plant operation volumes | |
|---|---|
| Input - total | 170 kg |
| Average throughput after deduction of the cool down phase | 35 kg/h |

Figure 16:
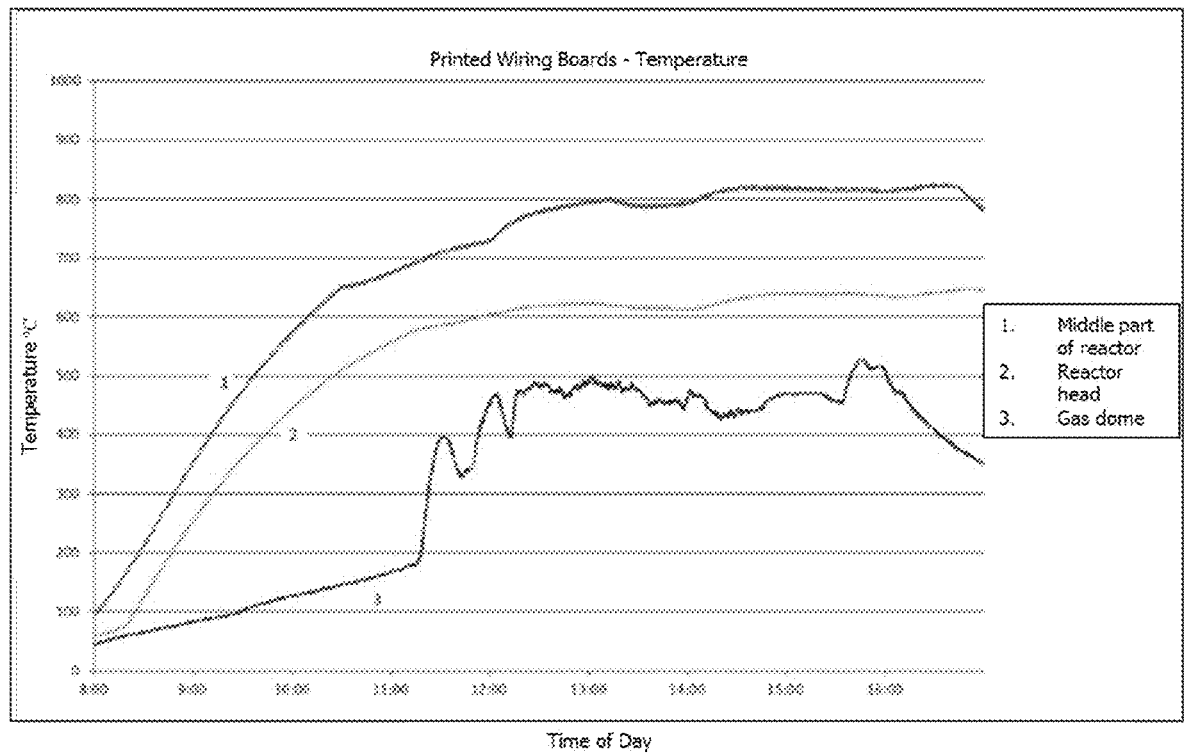
FIG. 16 depicts representative temperature measurements in the reactors employed for processing e-waste inputs according to embodiments of the invention.
Figure 17:
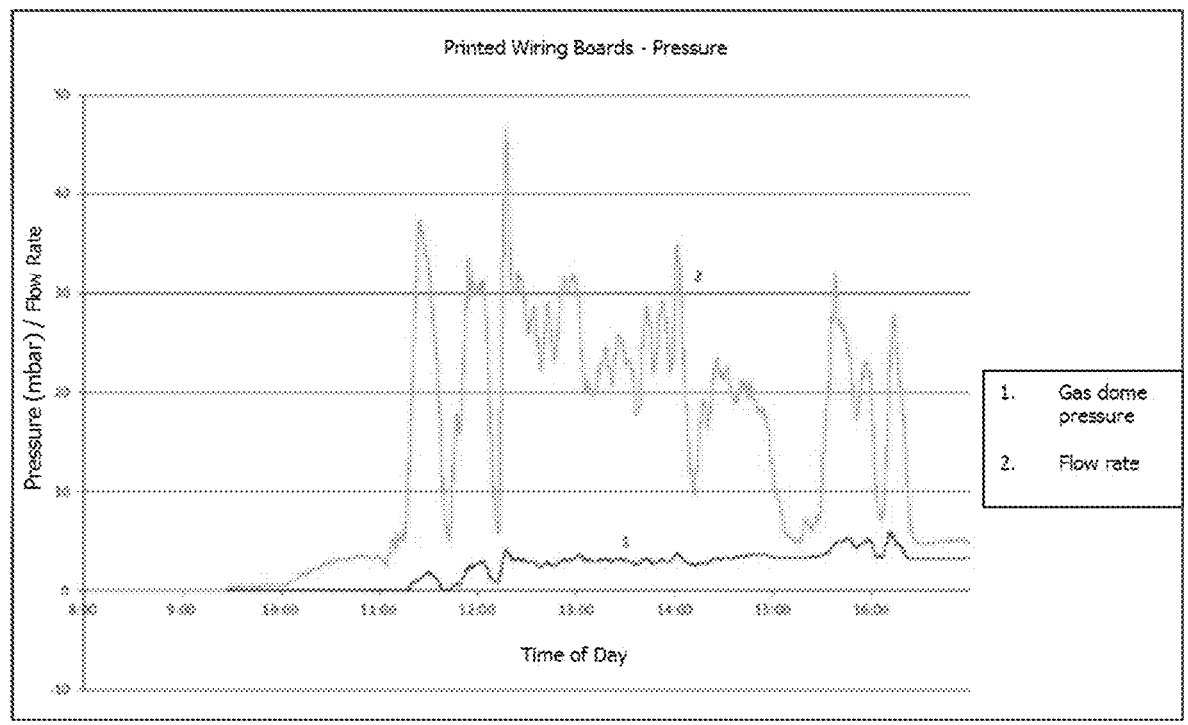
FIG. 17 depict representative gas flow measurements in the reactors employed for processing e-waste inputs according to embodiments of the invention.

The temperature and pressure measurements are shown in FIGS. 16-17 (measured in degrees Celsius) where Temperature 1 is the middle part of reactor; Temperature 2 is at the reactor head; and Temperature 3 is at the gas dome (FIG. 16) and Pressure (mbar) compared to flow rate is shown (FIG. 17).

Evaluation of the measured values and data. The plant was operated with an elevated temperature range in the reactor (>700° C.) to secure a complete chemical conversion of the e-waste input. The pressure in the reactor was on average >5 mbar. Significant pressure spikes were not recorded despite the high reactivity and rapid gasification of the material. Slight temperature adjustments were done during the test. The generated gas volumes had significant spikes due to high reactivity of the material, which could be equalized by a more constant infeed volume. The pilot plant would require a different infeed system for this feedstock and a much higher throughput could be achieved. This would also require additional equipment at the pilot plant to secure a fast cool down of the Char-metal mixture without air intrusion. The material infeed in intervals with the resulting increased gas generation is recorded in the first phase of the test. The throughput reduction later during the test was caused to increase the cool down time of the Char. These effects are not relevant for the test plant technology, but helpful for the total process evaluation. Different volumes of steam injection, such as from about 5 wt.-% to about 10 wt.-%, during this test did not influence the overall process data. Steam is added to control the moisture content of the incoming material stream. It is generated from process heat.

The reactor head temperatures measured between about 600° C.-800° C. These temperatures can be achieved also with a higher throughput as it will be regulated by the heat transfer capabilities of the Char.

Temperature control and the volume of scrubbed out components are relevant for the evaluation of the data from the gas scrubbing units. The temperature of scrubber 1 was regulated at ca. 75° C., scrubber 2 and 3 at 30° C. Media (oil or water in the scrubbers with any additives, such as alkalinity sources and/or stabilizers) were added to control the temperatures and filling level of the scrubbers. The condensates in scrubber 1 were long-chained hydrocarbons, which will be reinjected into the reactor. Water and aromatics were scrubbed out in scrubber 2. Process water without oil components were scrubbed out in No 3.

Explanations to the test operation. The reactivity of the test material was unknown. The Char-metal mixture with a high specific heat capacity required a longer cool down period than other previous tested feedstock. The gas production was pulsating due to the high reactivity of the feedstock, which caused no problems during the test at the pilot plant.

Sampling, Analysis, Evaluations. The feedstock and the Char samples were collected and analyzed. An additional analytical test for dioxins in the feedstock and Char was ordered. The gas samples were collected in special gas bottles and sent to the laboratory for external testing. The generated oil volume was very small and therefore was not analyzed. The oil samples were collected and available for analysis. The test samples were delivered to the laboratory after the test run for analysis. The analysis was done by using one representative sample and the conditions of different feedstock content could not be evaluated at this test.

Analysis data and M+E Balance. The results of the analysis are shown in Tables 2-4.

TABLE 2

Mass balance

| | Input | | Output | | | |
|---|---|---|---|---|---|---|
| | Input | Steam | Gas | Oil/Oligomeres | Char | Water |
| Mass [kg] | 170 | 23 | 64 | 3 | 108 | 15 |

TABLE 3

Analysis feedstock material

| Analysis parameter | Value | Dimension |
|---|---|---|
| Dry residue (TR) | 99.2 | Ma.-% |
| HF-Digestion | | |
| Iron | 5860 | mg/kg |
| Aluminum | 22500 | mg/kg |
| Copper | 352000 | mg/kg |
| Zinc | 778 | mg/kg |
| Tin | 92100 | mg/kg |
| Cadmium | 0.18 | mg/kg |
| Chromium | 21.4 | mg/kg |
| Nickel | 5630 | mg/kg |
| Lead | 24000 | mg/kg |
| Bromine | 20000 | mg/kg |
| Heating value | 8185 | kJ/kg |
| Chlorine | 1.13 | Ma.-% |

TABLE 4

Dioxin

| Analysis parameter | Dimension | BG | Value |
|---|---|---|---|
| PCDD/PCDF | | | |
| 2,3,7,8-TetraCDD | ng/kg TS | 1 | <1 |
| 1,2,3,7,8-PentaCDD | na/ka TS | 1 | <1 |
| 1,2,3,4,7,8-HexaCDD | ng/kg TS | 1 | <2 |
| 1,2,3,6,7,8-HexaCDD | ng/kg TS | 1 | <3 |
| 1,2,3,7,8,9-HexaCDD | ng/kg TS | 1 | <5 |
| 1,2,3,4,6,7,8-HeptaCDD | ng/kg TS | 5 | <15 |
| OctaCDD | ng/kg TS | 10 | <200 |
| 2,3,7,8-TetraCDF | ng/kg TS | 1 | <1 |
| 1,2,3,7,8-PentaCDF | ng/kg TS | 1 | <2 |
| 2,3,4,7,8-PentaCDF | ng/kg TS | 1 | <2 |
| 1,2,3,4,7,8-HexaCDF | ng/kg TS | 1 | <2 |
| 1,2,3,6,7,8-HexaCDF | ng/kg TS | 1 | <1 |
| 1,2,3,7,8,9-HexaCDF | ng/kg TS | 1 | <1 |
| 2,3,4,6,7,8-HexaCDF | ng/kg TS | 1 | <1 |
| 1,2,3,4,6,7,8-HeptaCDF | ng/kg TS | 3 | <5 |
| 1,2,3,4,7,8,9-HeptaCDF | ng/kg TS | 3 | <3 |
| OctaCDF | ng/kg TS | 10 | <15 |
| Sum PCDD/PCDF (WHO TE 2005) | ng TE/kg TS | | (n.b.*) |

The results shown in Tables 2-4 analyzed a representative sample from several collected samples. The analysis of an additional sample with larger metal particles yielded much less overall metals and cannot be considered as a representative sample. This analysis had an elevated level of Zn. The selective reduction of glass fiber particles increases the amount of metals and will not yield a representative sample.

The flame and/or fire retardants in the PWB feedstock are known to contain Bromine, which was analyzed at 2% in the feedstock. The analysis of the dioxins in the feedstock showed elevated levels of dioxins in the feedstock. Target of the test was to avoid creating new dioxins and reduce existing dioxins by cracking.

Analysis of the Product Gas. The results of the analysis are shown in Table 5.

TABLE 5

Product Gas (in Volume percentage)

| Main Components [Vol-%] | Gas 7_1_31 | Gas 7_1_33 |
|---|---|---|
| $H_2$ | 36.4 | 34.1 |
| $O_2$ | 0.30 | 0.31 |
| N2 | 1.70 | 1.9 |
| $CH_4$ | 22.2 | 22.5 |
| $CO_2$ | 11.2 | 10.3 |
| CO | 20.8 | 21.5 |
| Ethane | 0.66 | 1.0 |
| Ethene | 2.5 | 2.6 |
| Propane | <0.01 | 0.01 |
| Propene | 0.06 | 0.15 |
| i-Butane | <0.01 | <0.01 |
| n-Butane | <0.01 | <0.01 |
| Heating value [kWh/m$^3$] | 4.8 | 4.9 |

The samples of the generated gas were collected in Phase 1 and Phase 2 (13:50 and 15:50). The analysis results reflect homogeneous operating conditions. The gas analysis shows relatively high Hydrogen content and low paraffin content. The ratio of CO and $CO_2$ is characteristic for this temperature profile. Oxygen and Nitrogen are not components of the original gas compositions, but intruders into the gas sample during the transport of the glass vessels.

The molecular structure of the feedstock with characteristic Phenol components will not generate significant amounts of long chained molecules like paraffins and olefins. The aromatic components of the gas vapor will not be totally cracked without the cracking reactor and will generate a liquid fraction with low viscosity. The low amount of generated oily components can be pumped at average temperatures and can be converted with the cracking reactor.

Analysis of Char-Metal mixture. The results of the analysis are shown in Tables 6-7.

TABLE 6

Char-Metal mixture

| Analysis parameter | Value | Dimension |
|---|---|---|
| Dry Residue (TR) | 99.6 | Ma.-% |
| Carbon, raw | 9.1 | Ma.-% |
| Heating value, raw | 4032 | kJ/kg |
| HF-Digestion | | |
| Iron | 51900 | mg/kg |
| Aluminum | 18600 | mg/kg |
| Copper | 172000 | mg/kg |
| Zinc | 21600 | mg/kg |
| Tin | 9800 | mg/kg |
| Cadmium | 1.54 | mg/kg |
| Chromium | 74.9 | mg/kg |
| Nickel | 19400 | mg/kg |
| Lead | 2670 | mg/kg |
| Silver | 1.69 | mg/kg |

As shown in Table 6, the analysis results for the Char—metal mixture do not reflect the complete composition of the Char. The non-ferrous metals Al, Sn, Zn, and Cu are significantly too low. The analysis of the collected samples differs by a factor of 50%, which is based upon an uneven distribution of the content and particle size. Larger pieces of metals were found in the Char, which either agglomerated or melted. These agglomerations have to be added and were not shown in the analysis data.

TABLE 7

Dioxins

| Analysis parameter | Dimension | BG | Value |
|---|---|---|---|
| PCDD/PCDF | | | |
| 2,3,7,8-TetraCDD | ng/kg TS | 1 | <1 |
| 1,2,3,7,8-PentaCDD | ng/kg TS | 1 | <1 |
| 1,2,3,4,7,8-HexaCDD | ng/kg TS | 1 | <1 |
| 1,2,3,6,7,8-HexaCDD | ng/kg TS | 1 | <1 |
| 1,2,3,7,8,9-HexaCDD | ng/kg TS | 1 | <1 |
| 1,2,3,4,6,7,8-HeptaCDD | ng/kg TS | 5 | <5 |
| OctaCDD | ng/kg TS | 10 | <10 |
| 2,3,7,8-TetraCDF | ng/kg TS | 1 | <2 |
| 1,2,3,7,8-PentaCDF | ng/kg TS | 1 | <1 |
| 2,3,4,7,8-PentaCDF | ng/kg TS | 1 | <1 |
| 1,2,3,4,7,8-HexaCDF | ng/kg TS | 1 | <1 |
| 1,2,3,6,7,8-HexaCDF | ng/kg TS | 1 | <1 |
| 1,2,3,7,8,9-HexaCDF | ng/kg TS | 1 | <1 |
| 2,3,4,6,7,8-HexaCDF | ng/kg TS | 1 | <1 |
| 1,2,3,4,6,7,8-HeptaCDF | ng/kg TS | 3 | <3 |
| 1,2,3,4,7,8,9-HeptaCDF | ng/kg TS | 3 | <3 |
| OctaCDF | ng/kg TS | 10 | <10 |
| Sum PCDD/PCDF (WHO TE 2005) | ng TE/kg TS | | (n.b.*) |

As shown in Table 7, the Char has been analyzed for Dioxin content. Most measured data were below detection limit (data in the table are the detection limits and not the actual measured data of the Char). The analysis demonstrates that dioxins were not generated and that even existing dioxins in the feedstock were cracked during this test under chemical reducing conditions. A comparison of the dioxin values in the feedstock and the Char confirms the complete destruction of the dioxin molecules. Notably, the further destruction through cracking can be obtained by optimizing a feedstock processing by additional reactors to secure complete cracking by follow up reactions.

Overall results. The plant operation with the delivered feedstock was successful. The technical design of the pilot plant demonstrated the desired processing of the PWB feedstock. A gas for multiple applications has been generated and a Char—metal mixture suitable for further processing was obtained. Further benefits include the confirmation that no dioxins generated and existing dioxins cracked, confirming reduction to practice of not creating any toxic materials resulting from the brominated flame and/or fire retardants in the PWBs. Accordingly, the pilot plant demonstrated a stable performance with neither the composition of the plastics nor the metals having any negative impact on the process.

Example 4

A quantitative assessment of Char source generated according to the methods of the invention was conducted to assess the metals and other elements present in the Char source. The Char source was ground in a rod mill and then screened to separate based on size of the particulate matter. The undersize was the put through a shaking table. The table tails were then tested on a centrifugal separator for separation of the precious metals. Following separation of the metals and other elements the amounts from the mass balance are shown in either a % or ppm. The results are shown in Tables 8A-8C.

TABLE 8A

| Sample Number | Au (g/t) | Pd (g/t) | Pt (g/t) | Ag ppm | Al % | As ppm | B ppm | Ba ppm | Be ppm | Bi ppm | Ca % | Cd ppm | Ce ppm | Co ppm | Cr ppm | Cs ppm | Cu % | Fe % |
|---|---|---|---|---|---|---|---|---|---|---|---|---|---|---|---|---|---|---|
| 106104 | 9,180.10 | 228.77 | 1.62 | 662 | 1.03 | 157 | 239 | 5,777 | 18.7 | 143 | 0.10 | 7.8 | 3.7 | 91 | 215 | <0.5 | 58.95 | 15.30 |
| 106105 | 502.30 | 33.86 | 0.13 | 183 | 2.60 | 27 | 129 | 679 | 60.0 | 50 | 0.20 | 2.8 | 0.6 | 354 | 79 | <0.5 | 62.38 | 5.03 |
| 106106 | 1,363.68 | 94.15 | 0.39 | 125 | 3.00 | 10 | 576 | 5,164 | 15.1 | 78 | 0.63 | 4.4 | 4.0 | 139 | 153 | <0.5 | 41.82 | 7.40 |
| 106100 | 299.37 | 35.80 | 0.13 | 86 | 4.43 | 8 | 2,365 | 1,356 | 30.5 | 41 | 2.17 | 4.0 | 7.9 | 114 | 116 | <0.5 | 24.60 | 4.97 |
| 106149 | 1,537.15 | 44.87 | 0.39 | 176 | 2.83 | 56 | 145 | 5,958 | 86.7 | 43 | 0.20 | 3.1 | 1.8 | 264 | 144 | <0.5 | 70.52 | 5.97 |
| 106150 | 283.53 | 60.37 | 0.31 | 126 | 3.5 | 16 | 2,981 | 2,184 | 6.1 | 46 | 2.97 | 4.4 | 8.9 | 122 | 342 | <0.5 | 18.43 | 7.67 |
| 106151 | 1,009.09 | 61.21 | 0.30 | 214 | 8.80 | 77 | 319 | 9,336 | 18.2 | 51 | 0.40 | 3.8 | 5.2 | 205 | 142 | <0.5 | 62.16 | 5.60 |
| 106152 | 337.84 | 71.36 | 0.33 | 124 | 3.17 | 11 | 2,199 | 2,573 | 6.2 | 56 | 2.20 | 4.5 | 7.5 | 164 | 277 | <0.5 | 22.52 | 9.80 |
| 106153-4 | 3.32 | 8.77 | 0.07 | 86 | 4.90 | 24 | 8,258 | 1,197 | 7.7 | 23 | 7.95 | 5.4 | 18.3 | 26 | 91 | 1.2 | 2.50 | 1.95 |
|  | 123.70 | 14.62 | 0.08 | 66 | 3.15 | 14 | 4,420 | 1,049 | 9.7 | 22 | 4.25 | 3.4 | 10.2 | 46 | 272 |  | 34.19 | 4.87 |

TABLE 8B

| Sample Number | Ga ppm | Ge ppm | Hf ppm | Hg ppm | In ppm | K % | La ppm | Li ppm | Mg % | Mn ppm | Mo ppm | Na % | Nb ppm | Ni ppm | P ppm | Pb ppm | Rb ppm | Re ppm |
|---|---|---|---|---|---|---|---|---|---|---|---|---|---|---|---|---|---|---|
| 106104 | 6.1 | 6.5 | 4.5 | 0.15 | 62 | <0.1 | 2 | 10 | <0.1 | 1,758 | 74.3 | <0.1 | 7.60 | 21,438 | 192 | 29,479 | 1 | 0.02 |
| 106105 | 4.2 | 2.6 | 0.2 | <0.1 | 28 | <0.1 | <2 | <1 | <0.1 | 868 | 72.0 | <0.1 | 0.55 | 33,721 | 163 | 18,543 | <1 | 0.01 |
| 106106 | 4.1 | 1.7 | 3.9 | <0.1 | 25 | <0.1 | 2 | 2 | <0.1 | 3,374 | 54.6 | <0.1 | 4.35 | 18,970 | 133 | 17,786 | <1 | 0.01 |
| 106100 | 5.7 | 1.0 | 0.7 | <0.1 | 12 | <0.1 | 4 | 8 | 0.1 | 1,808 | 50.5 | 0.1 | 1.77 | 12,798 | 164 | 6,832 | 1 | 0.01 |
| 106149 | 6.1 | 2.9 | 1.9 | <0.1 | 30 | <0.1 | <2 | 1 | <0.1 | 1,768 | 175.0 | <0.1 | 2.90 | 36,803 | 169 | 9,866 | <1 | 0.02 |
| 106150 | 6.4 | 0.9 | 0.8 | <0.1 | 17 | <0.1 | 5 | 11 | 0.1 | 5,868 | 19.8 | 0.1 | 1.05 | 10,722 | 184 | 8,408 | 1 | <0.01 |
| 106151 | 13.0 | 3.4 | 4.8 | <0.1 | 26 | <0.1 | <2 | 2 | <0.1 | 3,373 | 335.3 | <0.1 | 8.10 | 10,748 | 158 | 8,814 | <1 | 0.01 |
| 106152 | 5.7 | 0.8 | 0.8 | <0.1 | 17 | <0.1 | 4 | 7 | 0.1 | 8,524 | 7.9 | 0.1 | 0.55 | 13,152 | 107 | 9,759 | <1 | 0.01 |
| 106153-4 | 10.0 | <0.5 | 0.5 | <0.1 | 2 | <0.1 | 10 | 29 | 0.3 | 1,714 | 11.8 | 0.3 | 0.75 | 1,823 | 383 | 4,780 | 3 | <0.01 |
|  | 6.0 | 0.3 | 0.5 | <0.1 | 5 | <0.1 |  | 15 |  | 1,332 | 16.3 | 0.2 | 0.79 | 4,474 | 221 | 4,731 |  | <0.01 |

TABLE 8C

| Sample Number | S % | Sb ppm | Sk ppm | Se ppm | Sn % | Sr ppm | Ta ppm | Te ppm | Th ppm | Ti % | Tl Ppm | U ppm | V ppm | W ppm | Y ppm | Zn ppm | Zr ppm |
|---|---|---|---|---|---|---|---|---|---|---|---|---|---|---|---|---|---|
| 106104 | 0.10 | 16,955 | 3 | 52 | 14.26 | 89 | 0.6 | 15.6 | <2 | 0.21 | <0.2 | <0.5 | 25 | 77.1 | 19 | 12,744 | 152 |
| 106105 | <0.1 | 1,796 | <1 | <2 | 8.25 | 19 | 0.1 | 1.3 | <2 | <0.5 | <0.2 | <0.5 | <10 | 8.2 | 6 | 13,906 | 15 |
| 106106 | <0.1 | 1,683 | <1 | <2 | 7.06 | 121 | 0.3 | <0.1 | <2 | 0.23 | <0.2 | <0.5 | 14 | 5.4 | 29 | 12,471 | 137 |
| 106100 | 0.10 | 2,773 | 1 | <2 | 2.91 | 229 | 0.5 | 2.1 | <2 | 0.14 | <0.2 | <0.5 | 15 | 6.1 | 15 | 9,566 | 39 |
| 106149 | <0.1 | 1,595 | <1 | 3 | 6.29 | 68 | 0.3 | 16.4 | <2 | 0.16 | <0.2 | <0.5 | 11 | 14.0 | 17 | 12,253 | 93 |
| 1106150 | 0.20 | 5,566 | 2 | 5 | 3.57 | 244 | 0.7 | 3.2 | <2 | 0.16 | <0.2 | 0.6 | 23 | 5.4 | 20 | 8,862 | 44 |
| 106151 | 0.10 | 2,536 | 1 | <2 | 5.82 | 163 | 0.8 | 7.1 | <2 | 0.31 | <0.2 | <0.5 | 19 | 65.9 | 28 | 12,019 | 258 |
| 106152 | 0.17 | 2,861 | 1 | 3 | 3.86 | 197 | 0.3 | 2.3 | <2 | 0.16 | <0.2 | <0.5 | 20 | 4.7 | 27 | 10,540 | 34 |
| 106153-4 | 0.20 | 3,008 | 4 | <2 | 0.39 | 578 | 0.7 | 1.9 | 4.5 | 0.09 | <0.2 | 1.2 | 32 | 6.4 | 8 | 5,599 | 31 |
|  | 0.11 | 1,975 |  | <2 | 1.18 | 320 | 0.4 | 1.3 |  | 0.07 | <0.2 | <0.5 | 18 | 4.4 | 7 | 4,954 | 27 |

For the data collected in Tables 8A-8C, for the +1.3 mm oversized matter, the materials were not able to be assayed as it was too coarse and heterogeneous. The amounts were estimated by grading by magnetic and visual classification (on half the material) and found the following: 81.7% copper color flakes (assumed to be pure copper for the mass balance); 10.6% magnetic flakes (assumed to be pure iron, although it probably contains other metals as well); 6.7% non-magnetic metals (not used in mass balance); and 1.0% carbon-like material (not used in mass balance). It was further assumed there were no precious metals in these oversized matter.

The data shows that the methods of the invention maintain the form of the metals and other elements, without introducing any contaminants and/or other hazardous materials. This beneficially, preserves the value of the metals and other elements.

As shown in Table 9, a gravity test mass balance is shown for the elements gold, palladium and platinum. This further demonstrates that specific metals and/or other elements of commercial interest can be recovered at high concentrations from the Char source according to the invention.

TABLE 9

| Element | Grade Weight (grams) | Dist % 19.2 |
|---|---|---|
| Au | 635.93 | 98.7% |
| Pd | 53.28 | 69.9 |
| Pt | 0.22 | 54.3 |

Example 5

As confirmed in Example 1, the methods of the invention have safely converted hydrocarbon materials containing halogens without creating PAHs. Exemplary e-waste sources include a typical desktop computer motherboard weighing approximately 1 pound. Of this total mass, about 30% will be in the board itself. The board also contains about 50% fiberglass for strength. This leaves about 15% for the resin binders. The bromine content of a PWB may be as high as 18%. Thus the halogen content may be around 2-3% by mass.

The methods of the invention are further evaluated to confirm processing of e-waste sources comprising up to 7%, 8%, 9%, 10% or more halogens processed according to the invention do not create PAHs, halogenated dibenzodioxins, halogenated dibenzofurans, biphenyls, and/or pyrenes. The confirmed tolerance level of the methods are from at least 7-10% halogens processed according to the invention without creating PAHs, halogenated dibenzodioxins, halogenated dibenzofurans, biphenyls, and/or pyrenes. Beneficially, the methods of the invention do not produce new molecules and further eliminate those contained in the e-waste source input itself.

Beneficially, as shown the methods of the invention are further able to volatilize and thereby effectively remove mercury through its capture in the scrubber system. As no mercury was detected in the Char residue and/or the gas produced according to the methods, the methods are demonstrated to be safe and effective for processing mercury containing e-waste without the requirement for removal of any mercury components by manual means. In a further assessment utilizing a sample of auto shredder residue, 50 ml of mercury was injected prior to the processing. After processing, no mercury was found in the char or in the gas, confirming complete removal by the scrubbers.

Example 6

Additional testing at a pilot facility was conducted as set forth in Examples 2 and 3, with the following modifications to the plant conditions for processing of ABS and Polystyrene feedstock as an e-waste source, namely the plastics accompanying e-waste:

Plant operation with the lower burner only

Feedstock infeed in short intervals

Reactor conditions with temperatures of 600° C. at the reactor top and 650° C. to 700° C. at the lower parts of the reactor.

Release of the gas from the gas dome to scrubber 1, no direct connection from the reactor head to scrubber 4.

Steam generation via heat exchanger and injection of the steam through special pipelines directly into the reactor head.

The Cracker-module for generated condensates was not in operation, because the volume of these oils was too low for an efficient operation.

The operation of the gas scrubbers was carried out without recirculation.

Level control in scrubber 1 and 2 by manual adjustments of the correct level.

Control of the oil water separator between the scrubbers and the gas pipeline of the plant during operation.

Special conditions for the test operation:

The selected basic operating parameters were continuously monitored and needed only miniscule adjustments. The Infeed volume of the feedstock was increased during the second phase of the test.

The feedstock input was continuous—in selected intervals. Due to the high reactivity and fast gasification of the feedstock, a pulsating increase in gas volume and pressure was monitored. This effect had no negative impact for the test operation. An increase of feedstock caused more gas generation and the slight pressure increase in the range of a few mbar had no impact on the test operation.

The water content in the reactor was slightly increased by steam injection, which increased the gas generation due to the chemical balance reactions.

The gas volume was constantly measured. The generated gas volume during phases of increased feedstock supply was at 30 m3/h and above, the average value was at ca. 15 m3/h.

The scrubber operated at normal stationary conditions. The differential pressure was in the range like the differential pressure in previous test runs.

No recirculation and injection of the generated oils from scrubbers 1 and 2. The low amount of oil components was removed from scrubbers 1 and 2 and collected.

The level control of the media during operation was adjusted constantly to its range level. All generated media (i.e. liquids contained in the scrubbers that also include relevant additives such as NaOH) were removed after the test and measured for the mass balance. As referred to herein for the media, the media are defined as oil and water with additives for gas cleaning.

No special technical adjustments were necessary during the test operation, the adjustments for this feedstock had been implemented in accordance with the instructions of the customer before the test run. No technical failures occurred. The plant operated perfectly stably and its capability to process this feedstock was proven.

TABLE 10

Summary test operations

Plant operation volumes

| Input - total | 250 kg |
|---|---|
| Average throughput 1. Phase/2. Phase | 70/35 kg/h |

Figure 18:
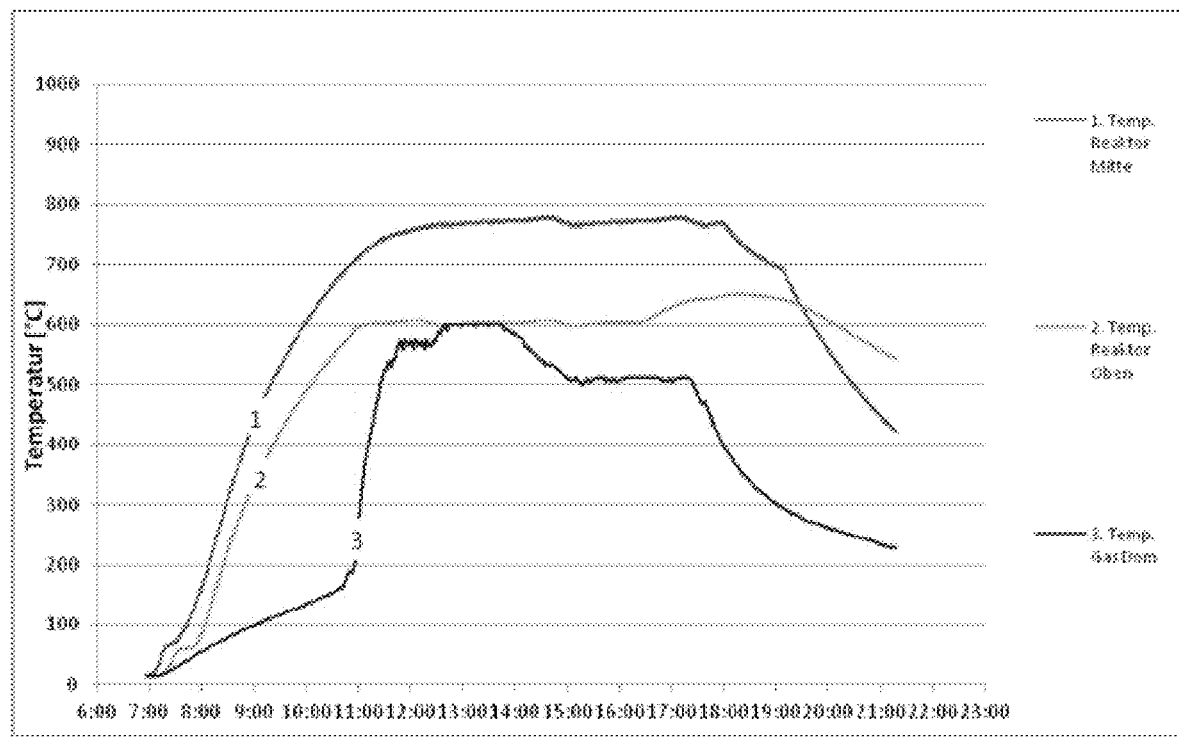
FIG. 18 depicts representative temperature measurements in the reactors employed for processing e-waste inputs according to embodiments of the invention.
Figure 19:
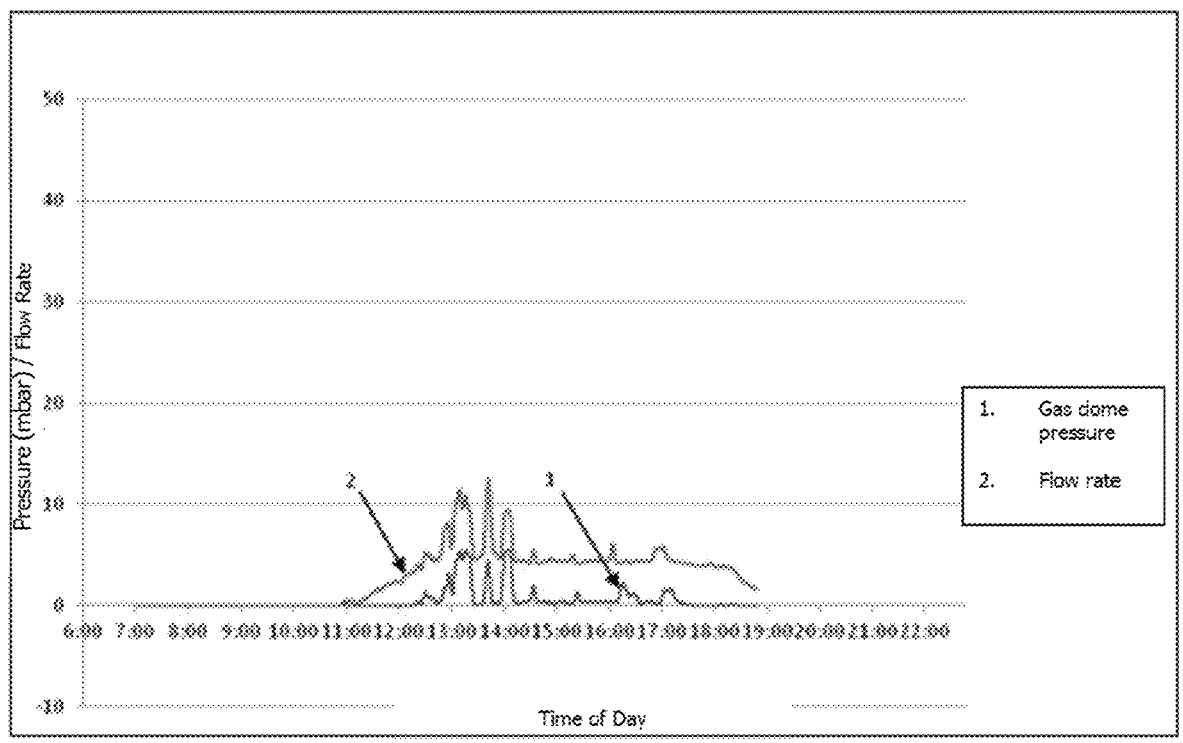
FIG. 19 depict representative gas flow measurements in the reactors employed for processing e-waste inputs according to embodiments of the invention.

The temperature and pressure measurements are shown in FIGS. 18-19 (measured in degrees Celsius) where Temperature 1 is the middle part of reactor; Temperature 2 is at the reactor head; and Temperature 3 is at the gas dome (FIG. 18) and Pressure (mbar) compared to flow rate is shown (FIG. 19).

Evaluation of the measured values and data. The plant was operated with a temperature range in the reactor of 600° C. to 700° C. The pressure in the reactor was on average >5 mbar. Significant pressure spikes were not recorded despite the high reactivity and rapid gasification of the material and pressure spikes stayed below 10 mbar. The throughput change of the feedstock is recorded in the measured data. The generated gas volumes had significant spikes due to high reactivity of the material; which this effect could be equalized by a more constant infeed volume. The reactor head temperatures were at 600° C. These temperatures can be achieved also with a higher throughput as it will be regulated by the heat transfer capabilities of the Char.

Temperature control and the volume of scrubbed-out components are relevant for the evaluation of the data from the gas scrubbing units. The temperature of scrubber 1 was regulated at ca. 79° C., scrubber 2 at 60° C. and 3 at 30° C. Media (water or oil and chemicals) were added to control the temperatures and filling level of the scrubbers. The condensates in scrubber 1 were long-chained hydrocarbons, which will be reinjected into the reactor. Water and aromatics were scrubbed out in scrubber 2. Process water without oil components were was scrubbed out in No 3. The oil components are aromatics, which can be reinjected into the process.

Absorption process. An additional scrubber was used to detect mercury and HBr. This scrubber was operated first with aqua regia to detect mercury and in a second phase with highly concentrated Sodium Hydroxide (NaOH). Neither Brominated salts nor Mercury could be detected.

Explanations to the test operation. The reactivity of the test material was unknown. The gas production was pulsating due to the high reactivity of the feedstock, which caused no problems during the test at the pilot plant. The test samples were delivered to the laboratory after the test run for analysis. The analysis was done by using one representative sample for the Input and Char, three gas samples were analyzed.

Sampling, Analysis, Evaluations. The feedstock and the Char samples were collected and analyzed. An additional analytical test for dioxins in the feedstock and Char was ordered. The test samples were delivered to the laboratory after the test run for analysis. The analysis was done by using one representative sample and the conditions of different feedstock content could not be evaluated at this test.

Analysis data and M+E Balance. The results of the analysis are shown in Tables 11-13.

TABLE 11

Mass balance

|  | Input |  | Output | | | |
|---|---|---|---|---|---|---|
|  | Input | Steam | Gas | Oil/Oligomeres | Char | Water |
| Mass [kg] | 250 | 30 | 110 | 65 | 57 | 45* |

TABLE 12

Analysis feedstock material

| Analysis parameter | Value | Dimension |
|---|---|---|
| Dry residue (TR) | 99.2 | Ma.-% |
| HF-Digestion | | |
| Iron | 304 | mg/kg |
| Aluminum | 417 | mg/kg |
| Copper | 73 | mg/kg |
| Zinc | 66.5 | mg/kg |
| Tin | 40.5 | mg/kg |
| Cadmium | <0.1 | mg/kg |
| Chromium | 10.4 | mg/kg |
| Nickel | 17.2 | mg/kg |
| Lead | 36.7 | mg/kg |
| Bromine | <100* | mg/kg |
| Heating value | 22 970 | kJ/kg |
| Chlorine | 0.04 | Ma.-% |

Bromine < 100*mg/kg: The laboratory accounted Bromine in the two digit range, but could not quantify it exactly and chose a conservative value of <100*mg/kg.

TABLE 13

| Dioxin | | | |
|---|---|---|---|
| Analysis parameter | Dimension | BG | Value |
| PCDD/PCDF | | | |
| 2,3,7,8-TetraCDD | ng/kg TS | <1 | <1 |
| 1,2,3,7,8-PentaCDD | ng/kg TS | <1 | <1 |
| 1,2,3,4,7,8-HexaCDD | ng/kg TS | <1 | <1 |
| 1,2,3,6,7,8-HexaCDD | ng/kg TS | <1 | <1 |
| 1,2,3,7,8,9-HexaCDD | na/ka TS | <1 | <1 |
| 1,2,3,4,6,7,8-HeptaCDD | ng/kg TS | *<6 | <5 |
| OctaCDD | ng/kg TS | *<25***** | <10 |
| 2,3,7,8-TetraCDF | ng/kg TS | <3 | <1 |
| 1,2,3,7,8-PentaCDF | ng/kg TS | <1 | <1 |
| 2,3,4,7,8-PentaCDF | ng/kg TS | <1 | <1 |
| 1,2,3,4,7,8-HexaCDF | ng/kg TS | <1 | <1 |
| 1,2,3,7,8,9-HexaCDF | ng/kg TS | <1 | <1 |
| 2,3,4,6,7,8-HexaCDF | ng/kg TS | <1 | <1 |
| 1,2,3,4,6,7,8-HeptaCDF | ng/kg TS | <3 | <3 |
| 1,2,3,4,7,8,9-HeptaCDF | ng/kg TS | <3 | <3 |
| OctaCDF | ng/kg TS | <10 | <10 |
| PBDD/PBDF | | | |
| 2,3,7,8-TetraBDD | ng/kg TS | <10 | <10 |
| 1,2,3,7,8-PentaBDD | ng/kg TS | <10 | <10 |
| 1,2,3,4,7,8-HexaBDD | ng/kg TS | <50 | <50 |
| 1,2,3,6,7,8-HexaBDD | ng/kg TS | <50 | <50 |
| 1,2,3,7,8,9-HexaBDD | ng/kg TS | <50 | <50 |
| 2,3,7,8-TetraBDF | ng/kg TS | <10 | <10 |
| 1,2,3,7,8-PentaCDF | ng/kg TS | <10 | <10 |
| 2,3,4,7,8-PentaCDF | na/ka TS | <10 | <10 |

The results above analyzed a representative sample from several collected samples. The e-plastics evaluated contain flame retardants in the feedstock which contain Bromine, which was analyzed with <100 mg/kg. The analysis of the dioxins in the feedstock are shown in table 5 and no dioxins are present in the feedstock.

The flame and/or fire retardants in the PWB feedstock are known to contain Bromine, which was analyzed at 2% in the feedstock. The analysis of the dioxins in the feedstock showed elevated levels of dioxins in the feedstock. Target of the test was to avoid creating new dioxins and reduce existing dioxins by cracking.

Analysis of the Product Gas. The results of the analysis are shown in Table 14.

TABLE 14

| Product Gas (in Volume percentage) | | |
|---|---|---|
| Main Components [Vol-%] | Gas 7_1_31 | Gas 7_1_33 |
| $H_2$ | 25.3 | 21.4 |
| $O_2$ | 0.68 | 0.39 |
| $N_2$ | 2.4 | 1.6 |
| $CH_4$ | 38.0 | 34.5 |
| $CO_2$ | 8.6 | 13.0 |
| CO | 14.8 | 13.1 |
| Ethane | 2.3 | 3.0 |
| Ethene | 5.0 | 5.1 |
| Propane | <0.05 | 0.24 |
| Propene | 0.87 | 1.7 |
| i-Butane | <0.01 | <0.01 |
| n-Butane | 0.01 | 0.01 |

The samples of the generated gas were collected in Phase 1 and Phase 2 (12.10, 15.10, 17.10). The analysis results reflect homogeneous operating conditions. The gas analysis shows a relative high Methane content and low paraffin content. The ratio of CO and $CO_2$ is characteristic for this temperature profile. Oxygen and Nitrogen are not components of the original gas compositions, but intruders into the gas sample during the transport of the glass vessels.

The molecular structure of the feedstock is characterized by an high Polystyrene content. Larger volumes of benzene and Methane are the result of this feedstock composition. The aromatic components of the gas vapor will not be totally cracked without the cracking reactor and will generate a liquid fraction with low viscosity. The low amount of generated oily components can be pumped at average temperatures and can be converted with the cracking reactor.

Analysis of Char-Metal mixture. The results of the analysis are shown in Tables 15-16. Value 94.6

TABLE 15

| Char-Metal mixture | | |
|---|---|---|
| Analysis parameter | Value | Dimension |
| Dry Residue (TR) | 94.6 | Ma.-% |
| Carbon, raw | 63 | Ma.-% |
| Heating value, raw | 22.390 | kJ/kg |
| Ash content, raw | 28.6 | Ma.-% |
| Aluminum | 9.860 | mg/kg |
| Copper | 9.050 | mg/kg |

TABLE 16

| Dioxins | | | |
|---|---|---|---|
| Analysis parameter | Dimension | BG | Value |
| PCDD/PCDF | | | |
| 2,3,7,8-TetraCDD | ng/kg TS | 1 | <1 |
| 1,2,3,7,8-PentaCDD | ng/kg TS | 1 | <1 |
| 1,2,3,4,7,8-HexaCDD | ng/kg TS | 1 | <1 |
| 1,2,3,6,7,8-HexaCDD | ng/kg TS | 1 | <1 |
| 1,2,3,7,8,9-HexaCDD | ng/kg TS | 1 | <1 |
| 1,2,3,4,6,7,8-HeptaCDD | ng/kg TS | 5 | <5 |
| OctaCDD | ng/kg TS | 10 | *<17 |
| 2,3,7,8-TetraCDF | ng/kg TS | 1 | <1 |
| 1,2,3,7,8-PentaCDF | ng/kg TS | 1 | <1 |
| 2,3,4,7,8-PentaCDF | ng/kg TS | 1 | <1 |
| 1,2,3,4,7,8-HexaCDF | ng/kg TS | 1 | <1 |
| 1,2,3,6,7,8-HexaCDF | ng/kg TS | 1 | <1 |
| 1,2,3,7,8,9-HexaCDF | ng/kg TS | 1 | <1 |
| 2,3,4,6,7,8-HexaCDF | ng/kg TS | 1 | <1 |
| 1,2,3,4,6,7,8-HeptaCDF | ng/kg TS | 3 | <3 |
| 1,2,3,4,7,8,9-HeptaCDF | ng/kg TS | 3 | <3 |
| OctaCDF | ng/kg TS | 10 | <10 |
| Sum PCDD/PCDF (WHO TE 2005) | ng TE/kg TS | | (n.b.*) |
| PBDD/PBDF | | | |
| 2,3,7,8-TetraBDD | ng/kg TS | <10 | <10 |
| 1,2,3,7,8-PentaBDD | ng/kg TS | <10 | <10 |
| 1,2,3,4,7,8-HexaBDD | ng/kg TS | <50 | <50 |
| 1,2,3,6,7,8-HexaBDD | ng/kg TS | <50 | <50 |
| 1,2,3,7,8,9-HexaBDD | ng/kg TS | <50 | *<180 |
| 2,3,7,8-TetraBDF | ng/kg TS | <10 | *<10 |
| 1,2,3,7,8-PentaCDF | ng/kg TS | <10 | <10 |
| 2,3,4,7,8-PentaCDF | ng/kg TS | <10 | <10 |

Figure 15:
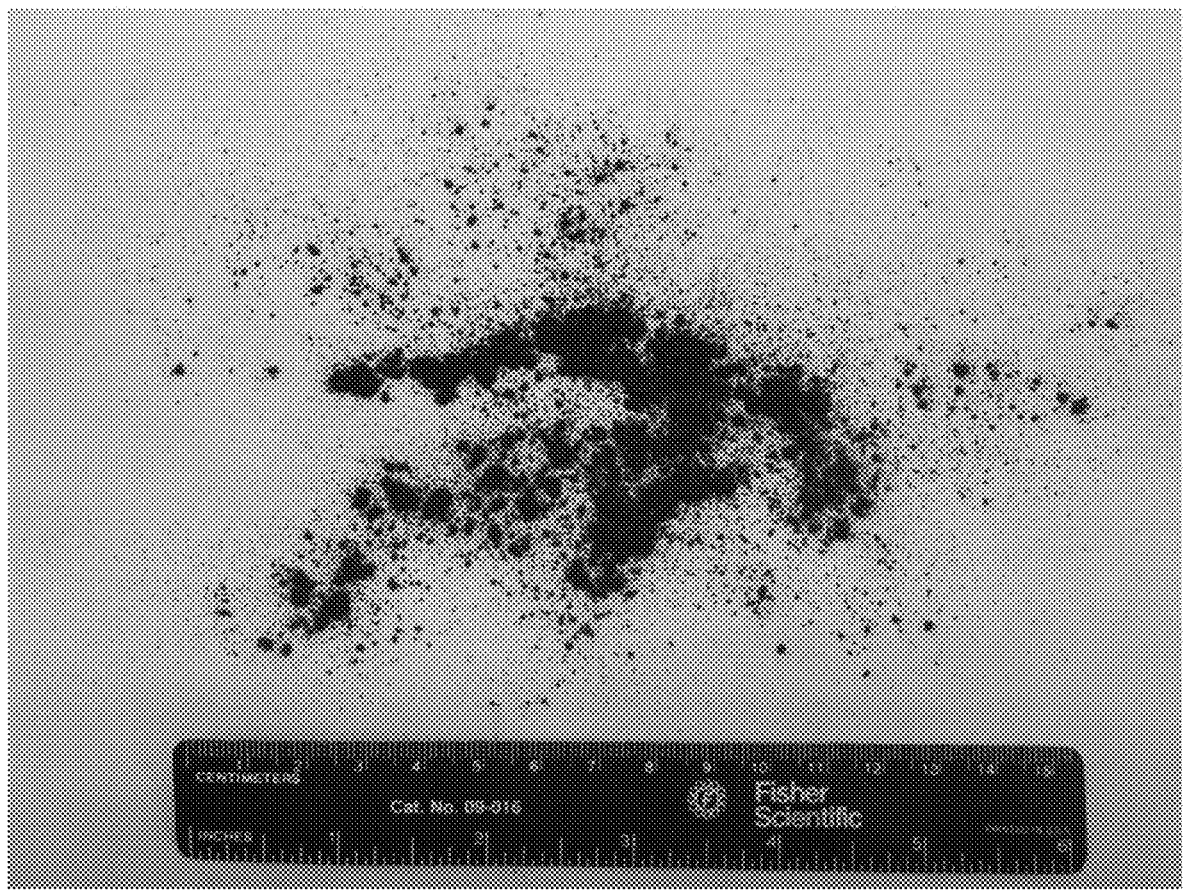

As shown in Table 15, the Char was analyzed for metal particles. In addition to the analyzed make-up of the metals in the remaining Char, approximately a 25 kg sample of the clean Char was sent for further assessment by separation and assay. The Char was separated by size. FIGS. 10-15 show photographs of separated materials in phases of separation according to optional embodiments of the invention from clean Char including: Oversized copper materials (1.3+mm) (FIG. 10), Smaller sized copper and precious metal materials (FIG. 11), additional finer sized copper and precious metal materials (FIG. 12), <300 um sized copper and precious metal materials (FIG. 13), additional finer sized copper and precious metal materials (FIG. 14), and primarily fine carbon material (FIG. 15). The char was first separated by passing through a trammel, then two shaking tables to separate materials +1.3 mm oversize and +600 μm. Two subsequent shaking tables collected approximately 600 μm and smaller sizes. Finally, rotary separation was used to collect the smallest parts of the char and unusable fines.

As shown in Table 16, the Char was further analyzed for any remaining dioxins. The results shown confirm the destruction of the flame retardants without generation of dioxins as a result of the methods of processing according to embodiments of the invention as shown by dioxin content in the Char being non-detectable.

Overall results. The plant operation with the delivered feedstock was successful. The technical design of the pilot plant demonstrated the desired processing of the e-plastics feedstock. A gas for multiple applications has been generated and a Char—metal mixture suitable for further processing was obtained. Further benefits include the confirmation that no dioxins generated and existing dioxins cracked, confirming reduction to practice of not creating any toxic materials resulting from the brominated flame and/or fire retardants in the e-plastics. Accordingly, the pilot plant demonstrated a stable performance with neither the composition of the plastics nor the metals having any negative impact on the process.

The results of the evaluation confirmed the methods of the invention meet the requirements for this specific feedstock consisting mostly of ABS and Polystyrene. The operation of the plant was verified for this material type in regard to its composition, melting specifications and expected fast gasification performance. The product specifications and the gas composition were as follows: (1) The gas has a suitable composition with high methane, hydrogen and carbon monoxide and low $CO_2$ content for further usage; (2) Hydrogen bromide has been neutralized in the gas scrubbers with sodium hydroxide; (3) The gas scrubbing efficiency was verified with an absorber after the scrubbers; (4) The destruction of the flame retardants without generation of dioxins was proven: the dioxin content in the Char was not detectable; and (5) The metal particles and the remaining Char were collected after the process (mechanically).

What is claimed is:

1. A Clean Fuel Gas source and a Char source, wherein a process for producing the Clean Fuel Gas source and the Char source comprises:
    inputting an electric and electronic waste source into a thermolysis system to generate the Clean Fuel Gas source and the Char source,
    wherein the thermolysis system comprises at least two reactors, an oil/water separator, an oil/tar cracker, and at least two gas scrubbers;
    wherein the reactors have a process temperature of about 300° C.–800° C. and generate tars and oils;
    wherein all of the oils and tars are separated in the oil/water separator and at least two gas scrubbers, thereafter cracked in the oil/tar cracker, and sent back to the secondary reactor to generate the Clean Fuel Gas source; and
    wherein the Clean Fuel Gas source and the Char source are substantially-free of halogenated organic compounds and do not contain oils and/or tars.

2. The Clean Fuel Gas source and the Char source of claim 1, wherein the Clean Fuel Gas source and the Char source are free of halogenated organic compounds.

3. The Clean Fuel and Gas source and the Char source of claim 1, wherein the Char source is in the form of a metallic state that is fine, flake, and/or chip.

4. The Clean Fuel Gas source and the Char source of claim 1, wherein the Char source comprises electronic metals, rare earth metals, precious metals, or combinations thereof.

5. The Clean Fuel Gas source and the Char source of claim 1, wherein the Char source comprises at least 50% recovery of the precious metals, electronic metals, and rare earth metals present in the electric and electronic waste source.

6. The Clean Fuel Gas source and the Char source of claim 1, wherein the Char source comprises at least about 75% recovery of the precious metals, electronic metals, and rare earth metals present in the electric and electronic waste source.

7. The Clean Fuel Gas source and the Char source of claim 1, wherein the Char source comprises at least about 95% recovery of the precious metals, electronic metals, and rare earth metals present in the electric and electronic waste source.

8. The Clean Fuel Gas source and the Char source of claim 1, wherein the Clean Fuel Gas source and the Char source are substantially-free of toxic chemicals.

9. The Clean Fuel Gas source and the Char source of claim 1, wherein the Clean Fuel Gas source and the Char source are free of toxic chemicals.

10. The Clean Fuel Gas source and the Char source of claim 1, wherein the Char source comprises glass reinforcement, glass fibers, carbon particulates, or combination thereof.

11. The Clean Fuel Gas source and the Char source of claim 1, wherein the Clean Fuel Gas source comprises hydrogen and/or methane.

12. The Clean Fuel Gas source and the Char source of claim 1, wherein the Clean Fuel Gas source comprises oxygen, carbon dioxide, nitrogen, ethane, ethene, propane, propene, butane, and/or carbon monoxide.

* * * * *